United States Patent
Kang et al.

(10) Patent No.: US 10,230,445 B2
(45) Date of Patent: Mar. 12, 2019

(54) DATA TRANSMISSION METHOD, DATA RECEPTION METHOD, DATA TRANSMISSION DEVICE AND DATA RECEPTION DEVICE

(71) Applicant: CHINA ACADEMY OF TELECOMMUNICATIONS TECHNOLOGY, Beijing (CN)

(72) Inventors: Shaoli Kang, Beijing (CN); Bin Ren, Beijing (CN); Yang Song, Beijing (CN)

(73) Assignee: China Academy Of Telecommunications Technology, Beijing (CN)

(*) Notice: Subject to any disclaimer, the term of this patent is extended or adjusted under 35 U.S.C. 154(b) by 0 days.

(21) Appl. No.: 15/564,196

(22) PCT Filed: Mar. 23, 2016

(86) PCT No.: PCT/CN2016/077094
§ 371 (c)(1),
(2) Date: Oct. 3, 2017

(87) PCT Pub. No.: WO2016/161895
PCT Pub. Date: Oct. 13, 2016

(65) Prior Publication Data
US 2018/0131433 A1    May 10, 2018

(30) Foreign Application Priority Data
Apr. 7, 2015    (CN) .......................... 2015 1 0162290

(51) Int. Cl.
*H04B 7/06* (2006.01)
*H04L 1/00* (2006.01)
(Continued)

(52) U.S. Cl.
CPC ....... *H04B 7/0639* (2013.01); *H04B 1/71072* (2013.01); *H04B 7/0663* (2013.01);
(Continued)

(58) Field of Classification Search
CPC ....... H04B 7/0663; H04B 7/0639; H04L 1/00; H04L 2025/03605; H04L 5/0007
See application file for complete search history.

(56) References Cited

U.S. PATENT DOCUMENTS

| 2006/0072680 A1 | 4/2006 | Wang et al. |
| 2010/0215110 A1 | 8/2010 | Onggosanusi et al. |

(Continued)

FOREIGN PATENT DOCUMENTS

| CN | 102045762 A | 5/2011 |
| CN | 102752070 A | 10/2012 |

(Continued)

OTHER PUBLICATIONS

International Preliminary Report on Patentability (IPRP; Ch. 1) from PCT/CN2016/077094, dated Oct. 19, 2017, and its English translation provided by WIPO.
(Continued)

*Primary Examiner* — Khaled M Kassim
*Assistant Examiner* — Syed Ali
(74) *Attorney, Agent, or Firm* — Ladas & Parry, LLP

(57) ABSTRACT

A data transmission method includes steps of: acquiring, by a network side, a current data transmission rule, the current data transmission rule including a mapping relationship between currently-scheduled K UEs and data layers on N transmission resources corresponding to a selected encoding matrix, one UE at least occupying one data layer; and transmitting, by the network side, data to the K UEs in accordance with the current data transmission rule.

13 Claims, 8 Drawing Sheets

--- acquiring, by a network side, a current data transmission rule, the current data transmission rule including a mapping relationship between currently-scheduled K UEs and data layers on N transmission resources corresponding to a selected encoding matrix, one UE at least occupying one data layer, $K \leq 2^N - 1$    110a transmitting, by the network side, data to the K UEs in accordance with the current data transmission rule    120a

(51) Int. Cl.
*H04L 25/03* (2006.01)
*H04B 1/7107* (2011.01)
*H04L 5/00* (2006.01)
H04L 25/02 (2006.01)
H04J 13/16 (2011.01)

(52) U.S. Cl.
CPC .............. *H04L 1/00* (2013.01); *H04L 5/0016* (2013.01); *H04L 25/03006* (2013.01); *H04J 13/16* (2013.01); *H04L 5/0007* (2013.01); *H04L 25/0204* (2013.01); *H04L 2025/03605* (2013.01)

(56) References Cited

U.S. PATENT DOCUMENTS

| | | |
|---|---|---|
| 2010/0303162 A1 | 12/2010 | Wang et al. |
| 2013/0343216 A1 | 12/2013 | Su et al. |
| 2015/0043540 A1* | 2/2015 | Nikopour ................ H04J 11/00 370/335 |
| 2016/0050039 A1* | 2/2016 | Ma ....................... H04L 5/0016 370/329 |
| 2016/0128045 A1* | 5/2016 | Azarian Yazdi ...... H04L 5/0053 370/330 |
| 2016/0338053 A1* | 11/2016 | Park .................. H04W 74/0808 |
| 2016/0381690 A1* | 12/2016 | Kim ..................... H04W 72/08 370/329 |
| 2017/0155484 A1* | 6/2017 | Kang ........................ H04L 1/06 |
| 2017/0265145 A1* | 9/2017 | Benjebbour .......... H04W 52/24 |
| 2018/0083746 A1* | 3/2018 | Kang .................... H04L 5/0007 |
| 2018/0123855 A1* | 5/2018 | Yoshizawa ............. H04J 13/16 |
| 2018/0242367 A1* | 8/2018 | Kim ..................... H04W 72/04 |

FOREIGN PATENT DOCUMENTS

| | | |
|---|---|---|
| EP | 3236634 A1 | 10/2017 |
| WO | 2016/095647 A1 | 6/2016 |

OTHER PUBLICATIONS

Written Opinion of the International Search Authority for PCT/CN2016/077094, dated May 27, 2016, and its English translation provided by WIPO.
From EPO Application No. 16776070.1, Supplementary European Search Report and Search Opinion dated Mar. 20, 2018.
Dai et al., "Successive Interference Cancelation Amenable Multiple Access (SAMA) for Future Wireless Communications"; 2014 IEEE International Conference on Communication Systems; Nov. 1, 2014; pp. 222-226.
International Search Report for PCT/CN2016/077094, dated May 27, 2016, and its English translation provided by WIPO.
Written Opinion of the International Search Authority for PCT/CN2016/077094, dated May 27, 2016, and its English translation provided by Bing.com Microsoft Translator.

* cited by examiner $$H_{PDMA}^{(2,3)} = \begin{bmatrix} 1 & 1 & 0 \\ 1 & 0 & 1 \end{bmatrix}_{2\times 3}$$

$$H^{(2,3)}_{PDMA} = \begin{bmatrix} 1 & 1 & 0 \\ 1 & 0 & 1 \end{bmatrix}_{2 \times 3}$$

☐ column to which UE 1 is mapped

┆ ┆ column to which UE 2 is mapped

Fig. 2b $$H^{(2,3)}_{PDMA} = \begin{bmatrix} 1 & 1 & 0 \\ 1 & 0 & 1 \end{bmatrix}_{2 \times 3}$$

☐ column to which UE 1 is mapped

┆ ┆ column to which UE 2 is mapped

Fig. 2c column to which UE 1 is mapped column to which UE 2 is mapped column to which UE 3 is mapped column to which UE 1 is mapped column to which UE 2 is mapped column to which UE 3 is mapped

DATA TRANSMISSION METHOD, DATA RECEPTION METHOD, DATA TRANSMISSION DEVICE AND DATA RECEPTION DEVICE

CROSS-REFERENCE TO RELATED APPLICATIONS

The present application is the U.S. national phase of PCT Application No. PCT/CN2016/077094 filed on Mar. 23, 2016, which claims a priority to of the Chinese patent application No. 201510162290.4 filed on Apr. 7, 2015, the disclosures of which are incorporated herein by reference in their entireties.

TECHNICAL FIELD

The present disclosure relates to the field of wireless communication technology, in particular to a data transmission method, a data reception method, a data transmission device and a data reception device.

BACKGROUND

For an Orthogonal Frequency Division Multiple Access (OFDMA) access mode adopted by a conventional Long Term Evolution (LTE) system designed on the basis of orthogonal transmission, it is able to perform data transmission and reception conveniently, and ensure the system performance. However, along with the rapid development of mobile Internet business and Internet of Things (IoT) business applications, a non-orthogonal multiple access technology has shown more advantages in terms of system capacity, time delay and the number of terminals supported thereby, so it may probably be adopted by a fifth Generation (5G) mobile communication system. For the non-orthogonal multiple access technology, information about different users is transmitted through an identical transmission resource, and interference is introduced artificially, so it is necessary to cancel the interference at a receiving end through a more complex receiver algorithm. Currently, some typical non-orthogonal multiple access technologies include Non-Orthogonal Multiple Access (NOMA), Sparse Code Multiple Access (SCMA) and Pattern Division Multiple Access (PDMA).

For the NOMA, multi-user signals are superimposed at a power domain, and a Serial Interference Cancellation (SIC) receiver is adopted at the receiving end. For the SCMA, as a novel frequency-domain non-orthogonal multiple access technology, different data streams are mapped to different codewords in a multi-dimensional codebook, each codeword represents an extended transport layer, and all the SCMA transport layers share an identical time-frequency resource block. At the receiving end, a decoding operation may be performed using an iterative Message Passing Algorithm (MPA) on the basis of sparsity of the codewords, so the SCMA has performance very close to optimal detection. For the PDMA, at a transmitting end, the users are differentiated from each other in accordance with non-orthogonal characteristic patterns of a signal from a terminal based on a plurality of signal domains such as the power domain, a code domain and a spatial domain using a pattern division technique, and at the receiving end, multi-user detection may be performed using a Belief Propagation (BP) algorithm receiver and the SCI receiver on the basis of a characteristic structure of a terminal pattern, so as to provide the system capacity approaching to a capacity boundary of a multiple access channel.

Currently, for the PDMA technology, an encoding matrix may be used as a basic mapping pattern so as to differentiate the users from each other. Usually, each row of the encoding matrix corresponds to a frequency-domain resource block which participates in data mapping for multi-user multiplexing, and each row represents a multi-user data pattern mapping mode. For example, in the case that N frequency-domain transmission resources are multiplexed by M users in a superposition encoding manner, a theoretical maximum value of M may be 2N−1, depending on a principle where the M users can be differentiated from each other in terms of their encoding modes. At this time, a theoretical multi-user superposition encoding matrix (i.e., HPDMA) formed through the multi-user superposition encoding may be expressed as the following equation:

$$H_{PDMA}^{(N,M)} = \begin{bmatrix} 1 & 1 & \cdots & 0 & 1 & \cdots & 0 \\ 1 & 1 & & 0 & \cdots & 0 & 0 \\ \vdots & \vdots & \ddots & \vdots & \cdots & \vdots & \ddots & \vdots \\ 1 & 0 & \cdots & 1 & & 0 & \cdots & 1 \end{bmatrix}_{N \times M} \quad (1)$$

diversity order = $N$    diversity order = $N-1$    diversity order = 1
$C_N^N$              $C_N^{N-1}$             $C_N^1$ For the conventional PDMA technology, with respect to the actual implementation capability of the system, an appropriate construction scheme of the PDMA encoding matrix may be determined, so as to make a compromise between the system capacity and the calculation complexity. However, in the related art, a pattern mapping mode between the multi-user data and the encoding matrix is inflexible, and in the finally-determined encoding matrix, usually the data for one user is merely mapped to a certain column of the encoding matrix. Hence, in the case that a small amount of users are scheduled by the system, it is impossible to increase a transmission load of a User Equipment (UE), and thereby a throughput of the system may be limited.

SUMMARY

An object of the present disclosure is to provide a data transmission method, a data reception method, a data transmission device and a data reception device, so as to solve the problem in the related art where, in the case that a small amount of users are scheduled by the system, it is hardly to increase the transmission load of the UE due to the mapping of the UEs to the encoding matrix in a single manner, and thereby the throughput of the system is limited.

In one aspect, the present disclosure provides in some embodiments a data transmission method, including steps of: acquiring, by a network side, a current data transmission rule, the current data transmission rule including a mapping relationship between currently-scheduled K UEs and data layers on N transmission resources corresponding to a selected encoding matrix, one UE at least occupying one data layer, K≤2N−1; and transmitting, by the network side, data to the K UEs in accordance with the current data transmission rule.

According to the data transmission method in the embodiments of the present disclosure, in the case of determining the number of the currently-scheduled UEs, various pattern-mapping encoding matrices may be selected flexibly. In addition, one UE is mapped to one or more data layers of the selected encoding matrix, so as to achieve the mapping relationship between multi-user data and the encoding matrix in a flexible manner. In the case that a frequency-domain resource block of a current system is multiplexed by a small amount of users, one UE may be mapped to a plurality of data layers, so it is able to increase a transmission load of the UE, thereby to increase a throughput of the entire system. Further, it is able to reduce a modulation encoding level while ensuring the spectral efficiency, thereby to further reduce algorithm complexity of a receiver.

In a possible embodiment of the present disclosure, prior to the step of acquiring the current data transmission rule, the data transmission method further includes: determining the number K of the currently-scheduled UEs and the number N of the transmission resources multiplexed by the UEs, $K \leq 2^N-1$; and selecting an encoding matrix used when the N transmission resources are multiplexed by $2^N-1$ predetermined data layers.

In a possible embodiment of the present disclosure, the step of determining the number K of the currently-scheduled UEs and the number N of the transmission resources multiplexed by the UEs, $K \leq 2^N-1$, and selecting the encoding matrix used when the N transmission resources are multiplexed by the $2^N-1$ predetermined data layers includes: selecting, in accordance with a plurality of values of n corresponding to a plurality of predetermined to-be-selected encoding matrices, a set of values of n which each meets a condition $K \leq 2^n-1$; selecting a set of the to-be-selected encoding matrices available for the K UEs from the plurality of to-be-selected encoding matrices in accordance with the set of values of n; and selecting the number N of the transmission resources which are capable of being currently multiplexed by the K UEs from the set of values of n, and selecting a to-be-selected encoding matrix corresponding to a value of N from the set of the to-be-selected encoding matrices as the encoding matrix used when the N transmission resources are multiplexed by the $2^N-1$ data layers, where n represents the number of the transmission resources corresponding to a to-be-selected encoding matrix, and the to-be-selected encoding matrix is an encoding matrix used when the N transmission resources are multiplexed by $2^n-1$ data layers.

In a possible embodiment of the present disclosure, the step of selecting the number N of the transmission resources which are capable of being currently multiplexed by the K UEs from the set of values of n, and selecting the to-be-selected encoding matrix corresponding to the value of N from the set of the to-be-selected encoding matrices as the encoding matrix used when the N transmission resources are multiplexed by the $2^N-1$ data layers includes: selecting a random value from the set of values of n as the number N of the transmission resources which are capable of being currently multiplexed by the K UEs, the random value being not greater than the number of system-available frequency-domain resources and the corresponding $2^n-1$ predetermined data layers being capable of meeting a load requirement of the K UEs; and selecting a to-be-selected encoding matrix corresponding to the value of N from the set of the to-be-selected encoding matrices as the encoding matrix used when the N transmission resources are multiplexed by the $2^N-1$ data layers.

In a possible embodiment of the present disclosure, with respect to the mapping relationship between the K UEs and the data layers on the N transmission resources corresponding to the encoding matrix, each UE is mapped to at least one column of the encoding matrix that meets a corresponding transmission requirement parameter in accordance with the transmission requirement parameter of each UE, e of the encoding matrix corresponds to one data layer.

In a possible embodiment of the present disclosure, the transmission requirement parameter at least includes a load of each UE, and any one of the following parameters or any combination of the following combinations: signal-to-noise ratio (SNR), block error rate (BER) and power resource.

In a possible embodiment of the present disclosure, each UE is mapped to one column of the encoding matrix that meets the transmission requirement parameter, or mapped to at least two columns of the encoding matrix that have an identical diversity order and meet the transmission requirement parameter, or mapped to at least two columns of the encoding matrix that have different diversity orders and meet the transmission requirement parameter. The diversity order is defined as the number of non-zero elements in each column of the encoding matrix and it is used to represent frequency-domain diversity acquired for data transmission.

In another aspect, the present disclosure provides in some embodiments a data reception method, including steps of: acquiring, by a network side, a current data transmission rule, the current data transmission rule including a mapping relationship between currently-scheduled K UEs and data layers on N transmission resources corresponding to a selected encoding matrix, one UE at least occupying one data layer, $K \leq 2^{N-1}$; and receiving, by the network side, data transmitted from the K UEs in accordance with the current data transmission rule.

According to the data reception method in the embodiments of the present disclosure, in the case of determining the number of the currently-scheduled UEs, various pattern-mapping encoding matrices may be selected flexibly. In addition, one UE is mapped to one or more data layers of the selected encoding matrix, so as to achieve the mapping relationship between multi-user data and the encoding matrix in a flexible manner. In the case that a frequency-domain resource block of a current system is multiplexed by a small amount of users, one UE may be mapped to a plurality of data layers, so it is able to increase a transmission load of the UE, thereby to increase a throughput of the entire system. Further, it is able to reduce a modulation encoding level while ensuring the spectral efficiency, thereby to further reduce algorithm complexity of a receiver.

In a possible embodiment of the present disclosure, prior to the step of acquiring the current data transmission rule, the data reception method further includes: determining the number K of the currently-scheduled UEs and the number N of the transmission resources multiplexed by the UEs, $K \leq 2^N-1$; and selecting an encoding matrix used when the N transmission resources are multiplexed by $2^N-1$ predetermined data layers.

In a possible embodiment of the present disclosure, the step of determining the number K of the currently-scheduled UEs and the number N of the transmission resources multiplexed by the UEs, $K \leq 2^N-1$, and selecting the encoding matrix used when the N transmission resources are multiplexed by the $2^N-1$ predetermined data layers includes: selecting, in accordance with a plurality of values of n corresponding to a plurality of predetermined to-be-selected encoding matrices, a set of values of n which each meets a condition $K \leq 2^n-1$; selecting a set of the to-be-selected encoding matrices available for the K UEs from the plurality of to-be-selected encoding matrices in accordance with the set of values of n; and selecting the number N of the transmission resources which are capable of being currently multiplexed by the K UEs from the set of values of n, and selecting a to-be-selected encoding matrix corresponding to a value of N from the set of the to-be-selected encoding matrices as the encoding matrix used when the N transmission resources are multiplexed by the $2^N-1$ data layers, where n represents the number of the transmission resources corresponding to a to-be-selected encoding matrix, and the to-be-selected encoding matrix is an encoding matrix used when the N transmission resources are multiplexed by $2^n-1$ data layers.

In a possible embodiment of the present disclosure, the step of selecting the number N of the transmission resources which are capable of being currently multiplexed by the K UEs from the set of values of n, and selecting the to-be-selected encoding matrix corresponding to the value of N from the set of the to-be-selected encoding matrices as the encoding matrix used when the N transmission resources are multiplexed by the $2^N-1$ data layers includes: selecting a random value from the set of values of n as the number N of the transmission resources which are capable of being currently multiplexed by the K UEs, the random value being not greater than the number of system-available frequency-domain resources and the corresponding $2^n-1$ predetermined data layers being capable of meeting a load requirement of the K UEs; and selecting a to-be-selected encoding matrix corresponding to the value of N from the set of the to-be-selected encoding matrices as the encoding matrix used when the N transmission resources are multiplexed by the $2^N-1$ data layers.

In a possible embodiment of the present disclosure, with respect to the mapping relationship between the K UEs and the data layers on the N transmission resources corresponding to the encoding matrix, each UE is mapped to at least one column of the encoding matrix that meets a corresponding transmission requirement parameter in accordance with the transmission requirement parameter of each UE, and each column of the encoding matrix corresponds to one data layer.

In a possible embodiment of the present disclosure, the transmission requirement parameter at least includes a load of each UE, any one of the following parameters or any combination of the following combinations: signal-to-noise ratio (SNR), block error rate (BER) and power resource.

In a possible embodiment of the present disclosure, each UE is mapped to one column of the encoding matrix that meets the transmission requirement parameter, or mapped to at least two columns of the encoding matrix that have an identical diversity order and meet the transmission requirement parameter, or mapped to at least two columns of the encoding matrix that have different diversity orders and meet the transmission requirement parameter. The diversity order is defined as the number of non-zero elements in each column of the encoding matrix and it is used to represent frequency-domain diversity acquired for data transmission.

In yet another aspect, the present disclosure provides in some embodiments a data transmission method, including steps of: acquiring, by a UE, a current data transmission rule, the current data transmission rule including a mapping relationship between currently-scheduled K UEs and data layers on N transmission resources corresponding to a selected encoding matrix, one UE at least occupying one data layer, $K \leq 2^N-1$; and transmitting, by the UE, data to a network side in accordance with the current data transmission rule through the at least one data layer occupied by the UE in the encoding matrix.

According to the data transmission method in the embodiments of the present disclosure, in the case of determining the number of the currently-scheduled UEs, various pattern-mapping encoding matrices may be selected flexibly. In addition, one UE is mapped to one or more data layers of the selected encoding matrix, so as to achieve the mapping relationship between multi-user data and the encoding matrix in a flexible manner. In the case that a frequency-domain resource block of a current system is multiplexed by a small amount of users, one UE may be mapped to a plurality of data layers, so it is able to increase a transmission load of the UE, thereby to increase a throughput of the entire system. Further, it is able to reduce a modulation encoding level while ensuring the spectral efficiency, thereby to further reduce algorithm complexity of a receiver.

In a possible embodiment of the present disclosure, prior to the step of acquiring the current data transmission rule, the data transmission method further includes: determining from the network side, the number K of the currently-scheduled UEs and the number N of the transmission resources multiplexed by the UEs, $K \leq 2^N-1$; and selecting an encoding matrix used when the N transmission resources are multiplexed by $2^N-1$ predetermined data layers.

In a possible embodiment of the present disclosure, the step of determining, from the network side, the number K of the currently-scheduled UEs and the number N of the transmission resources multiplexed by the UEs, $K \leq 2^N-1$, and selecting the encoding matrix used when the N transmission resources are multiplexed by the $2^N-1$ predetermined data layers includes: selecting, in accordance with a plurality of values of n corresponding to a plurality of predetermined to-be-selected encoding matrices, a set of values of n which each meets a condition $K \leq 2^n-1$; selecting a set of the to-be-selected encoding matrices available for the K UEs from the plurality of to-be-selected encoding matrices in accordance with the set of values of n; and selecting the number N of the transmission resources which are capable of being currently multiplexed by the K UEs from the set of values of n, and selecting a to-be-selected encoding matrix corresponding to a value of N from the set of the to-be-selected encoding matrices as the encoding matrix used when the N transmission resources are multiplexed by the $2^N-1$ data layers, where n represents the number of the transmission resources corresponding to a to-be-selected encoding matrix, and the to-be-selected encoding matrix is an encoding matrix used when the N transmission resources are multiplexed by $2^n-1$ data layers.

In a possible embodiment of the present disclosure, the step of selecting the number N of the transmission resources which are capable of being currently multiplexed by the K UEs from the set of values of n, and selecting the to-be-selected encoding matrix corresponding to the value of N from the set of the to-be-selected encoding matrices as the encoding matrix used when the N transmission resources are multiplexed by the $2^N-1$ data layers includes: selecting a random value from the set of values of n as the number N of the transmission resources which are capable of being currently multiplexed by the K UEs, the random value being not greater than the number of system-available frequency-domain resources and the corresponding $2^n-1$ predetermined data layers being capable of meeting a load requirement of the K UEs; and selecting a to-be-selected encoding matrix corresponding to the value of N from the set of the to-be-selected encoding matrices as the encoding matrix used when the N transmission resources are multiplexed by the $2^N-1$ data layers.

In a possible embodiment of the present disclosure, with respect to the mapping relationship between the K UEs and the data layers on the N transmission resources corresponding to the encoding matrix, each UE is mapped to at least one column of the encoding matrix that meets a corresponding transmission requirement parameter in accordance with the transmission requirement parameter of each UE, and each column of the encoding matrix corresponds to one data layer.

In a possible embodiment of the present disclosure, the transmission requirement parameter at least includes a load of each UE, and any one of the following parameters or any combination of the following combinations: signal-to-noise ratio (SNR), block error rate (BER) and power resource.

In a possible embodiment of the present disclosure, each UE is mapped to one column of the encoding matrix that meets the transmission requirement parameter, or mapped to at least two columns of the encoding matrix that have an identical diversity order and meet the transmission requirement parameter, or mapped to at least two columns of the encoding matrix that have different diversity orders and meet the transmission requirement parameter. The diversity order is defined as the number of non-zero elements in each column of the encoding matrix and it is used to represent frequency-domain diversity acquired for data transmission.

In still yet another aspect, the present disclosure provides in some embodiments a data reception method, including steps of: acquiring, by a UE, a current data transmission rule, the current data transmission rule including a mapping relationship between currently-scheduled K UEs and data layers on N transmission resources corresponding to a selected encoding matrix, one UE at least occupying one data layer, $K \leq 2^N-1$; and receiving, by the UE, feedback data from a network side, the feedback data being fed back by the network side after receiving data transmitted from the UE in accordance with the current data transmission rule.

According to the data reception method in the embodiments of the present disclosure, in the case of determining the number of the currently-scheduled UEs, various pattern-mapping encoding matrices may be selected flexibly. In addition, one UE is mapped to one or more data layers of the selected encoding matrix, so as to achieve the mapping relationship between multi-user data and the encoding matrix in a flexible manner. In the case that a frequency-domain resource block of a current system is multiplexed by a small amount of users, one UE may be mapped to a plurality of data layers, so it is able to increase a transmission load of the UE, thereby to increase a throughput of the entire system. Further, it is able to reduce a modulation encoding level while ensuring the spectral efficiency, thereby to further reduce algorithm complexity of a receiver.

In a possible embodiment of the present disclosure, prior to the step of acquiring the current data transmission rule, the data reception method further includes: determining from the network side, the number K of the currently-scheduled UEs and the number N of the transmission resources multiplexed by the UEs, $K \leq 2^N-1$; and selecting an encoding matrix used when the N transmission resources are multiplexed by $2^N-1$ predetermined data layers.

In a possible embodiment of the present disclosure, the step of determining, from the network side, the number K of the currently-scheduled UEs and the number N of the transmission resources multiplexed by the UEs, $K \leq 2^N-1$, and selecting the encoding matrix used when the N transmission resources are multiplexed by the $2^N-1$ predetermined data layers includes: selecting, in accordance with a plurality of values of n corresponding to a plurality of predetermined to-be-selected encoding matrices, a set of values of n which each meets a condition $K \leq 2^n-1$; selecting a set of the to-be-selected encoding matrices available for the K UEs from the plurality of to-be-selected encoding matrices in accordance with the set of values of n; and selecting the number N of the transmission resources which are capable of being currently multiplexed by the K UEs from the set of values of n, and selecting a to-be-selected encoding matrix corresponding to a value of N from the set of the to-be-selected encoding matrices as the encoding matrix used when the N transmission resources are multiplexed by the $2^N-1$ data layers, where n represents the number of the transmission resources corresponding to a to-be-selected encoding matrix, and the to-be-selected encoding matrix is an encoding matrix used when the N transmission resources are multiplexed by $2^n-1$ data layers.

In a possible embodiment of the present disclosure, the step of selecting the number N of the transmission resources which are capable of being currently multiplexed by the K UEs from the set of values of n, and selecting the to-be-selected encoding matrix corresponding to the value of N from the set of the to-be-selected encoding matrices as the encoding matrix used when the N transmission resources are multiplexed by the $2^N-1$ data layers includes: selecting a random value from the set of values of n as the number N of the transmission resources which are capable of being currently multiplexed by the K UEs, the random value being not greater than the number of system-available frequency-domain resources and the corresponding $2^n-1$ predetermined data layers being capable of meeting a load requirement of the K UEs; and selecting a to-be-selected encoding matrix corresponding to the value of N from the set of the to-be-selected encoding matrices as the encoding matrix used when the N transmission resources are multiplexed by the $2^N-1$ data layers.

In a possible embodiment of the present disclosure, with respect to the mapping relationship between the K UEs and the data layers on the N transmission resources corresponding to the encoding matrix, each UE is mapped to at least one column of the encoding matrix that meets a corresponding transmission requirement parameter in accordance with the transmission requirement parameter of each UE, and each column of the encoding matrix corresponds to one data layer.

In a possible embodiment of the present disclosure, the transmission requirement parameter at least includes a load of each UE, and any one of the following parameters or any combination of the following combinations: signal-to-noise ratio (SNR), block error rate (BER) and power resource.

In a possible embodiment of the present disclosure, each UE is mapped to one column of the encoding matrix that meets the transmission requirement parameter, or mapped to at least two columns of the encoding matrix that have an identical diversity order and meet the transmission requirement parameter, or mapped to at least two columns of the encoding matrix that have different diversity orders and meet the transmission requirement parameter. The diversity order is defined as the number of non-zero elements in each column of the encoding matrix and it is used to represent frequency-domain diversity acquired for data transmission.

In still yet another aspect, the present disclosure provides in some embodiments a network side device, including: a processing unit configured to acquire a current data transmission rule, the current data transmission rule including a mapping relationship between currently-scheduled K UEs and data layers on N transmission resources corresponding to a selected encoding matrix, one UE at least occupying one data layer, $K \leq 2^N-1$; and a transmission unit configured to transmit data to the K UEs in accordance with the current data transmission rule.

According to the network side device in the embodiments of the present disclosure, in the case of determining the number of the currently-scheduled UEs, various pattern-mapping encoding matrices may be selected flexibly. In addition, one UE is mapped to one or more data layers of the selected encoding matrix, so as to achieve the mapping relationship between multi-user data and the encoding matrix in a flexible manner. In the case that a frequency-domain resource block of a current system is multiplexed by a small amount of users, one UE may be mapped to a plurality of data layers, so it is able to increase a transmission load of the UE, thereby to increase a throughput of the entire system. Further, it is able to reduce a modulation encoding level while ensuring the spectral efficiency, thereby to further reduce algorithm complexity of a receiver.

In a possible embodiment of the present disclosure, prior to acquiring the current data transmission rule, the network side device further includes a selection unit configured to: determine the number K of the currently-scheduled UEs and the number N of the transmission resources multiplexed by the UEs, $K \leq 2^N - 1$; and select an encoding matrix used when the N transmission resources are multiplexed by $2^N - 1$ predetermined data layers.

In a possible embodiment of the present disclosure, in the case of determining the number K of the currently-scheduled UEs and the number N of the transmission resources multiplexed by the UEs, $K \leq 2^N - 1$, and selecting the encoding matrix used when the N transmission resources are multiplexed by the $2^N - 1$ predetermined data layers, the selection unit is further configured to: select, in accordance with a plurality of values of n corresponding to a plurality of predetermined to-be-selected encoding matrices, a set of values of n which each meets a condition $K \leq 2^n - 1$; select a set of the to-be-selected encoding matrices available for the K UEs from the plurality of to-be-selected encoding matrices in accordance with the set of values of n; and select the number N of the transmission resources which are capable of being currently multiplexed by the K UEs from the set of values of n, and select a to-be-selected encoding matrix corresponding to a value of N from the set of the to-be-selected encoding matrices as the encoding matrix used when the N transmission resources are multiplexed by the $2^N - 1$ data layers, where n represents the number of the transmission resources corresponding to a to-be-selected encoding matrix, and the to-be-selected encoding matrix is an encoding matrix used when the N transmission resources are multiplexed by $2^n - 1$ data layers.

In a possible embodiment of the present disclosure, in the case of selecting the number N of the transmission resources which are capable of being currently multiplexed by the K UEs from the set of values of n, and selecting the to-be-selected encoding matrix corresponding to the value of N from the set of the to-be-selected encoding matrices as the encoding matrix used when the N transmission resources are multiplexed by the $2^N - 1$ data layers, the selection unit is further configured to: select a random value from the set of values of n as the number N of the transmission resources which are capable of being currently multiplexed by the K UEs, the random value being not greater than the number of system-available frequency-domain resources and the corresponding $2^n - 1$ predetermined data layers being capable of meeting a load requirement of the K UEs; and select a to-be-selected encoding matrix corresponding to the value of N from the set of the to-be-selected encoding matrices as the encoding matrix used when the N transmission resources are multiplexed by the $2^N - 1$ data layers.

In a possible embodiment of the present disclosure, in the case that the processing unit acquires the current data transmission rule, with respect to the mapping relationship between the K UEs and the data layers on the N transmission resources corresponding to the encoding matrix, each UE is mapped to at least one column of the encoding matrix that meets a corresponding transmission requirement parameter in accordance with the transmission requirement parameter of each UE, and each column of the encoding matrix corresponds to one data layer.

In a possible embodiment of the present disclosure, in the case that the processing unit determines the mapping relationship between the K UEs and the data layers on the N transmission resources corresponding to the encoding matrix, the transmission requirement parameter at least includes a load of each UE, and any one of the following parameters or any combination of the following combinations: signal-to-noise ratio (SNR), block error rate (BER) and power resource.

In a possible embodiment of the present disclosure, in the case that the processing unit acquires the current data transmission rule, each UE is mapped to one column of the encoding matrix that meets the transmission requirement parameter, or mapped to at least two columns of the encoding matrix that have an identical diversity order and meet the transmission requirement parameter, or mapped to at least two columns of the encoding matrix that have different diversity orders and meet the transmission requirement parameter. The diversity order is defined as the number of non-zero elements in each column of the encoding matrix and it is used to represent frequency-domain diversity acquired for data transmission.

In still yet another aspect, the present disclosure provides in some embodiments a network side device, including: a processing unit configured to acquire a current data transmission rule, the current data transmission rule including a mapping relationship between currently-scheduled K UEs and data layers on N transmission resources corresponding to a selected encoding matrix, one UE at least occupying one data layer, $K \leq 2^N - 1$; and a reception unit configured to receive data transmitted from the K UEs in accordance with the current data transmission rule.

According to the network side device in the embodiments of the present disclosure, in the case of determining the number of the currently-scheduled UEs, various pattern-mapping encoding matrices may be selected flexibly. In addition, one UE is mapped to one or more data layers of the selected encoding matrix, so as to achieve the mapping relationship between multi-user data and the encoding matrix in a flexible manner. In the case that a frequency-domain resource block of a current system is multiplexed by a small amount of users, one UE may be mapped to a plurality of data layers, so it is able to increase a transmission load of the UE, thereby to increase a throughput of the entire system. Further, it is able to reduce a modulation encoding level while ensuring the spectral efficiency, thereby to further reduce algorithm complexity of a receiver.

In a possible embodiment of the present disclosure, prior to acquiring the current data transmission rule, the network side device further includes a selection unit configured to: determine the number K of the currently-scheduled UEs and the number N of the transmission resources multiplexed by the UEs, $K \leq 2^N - 1$; and select an encoding matrix used when the N transmission resources are multiplexed by $2^N - 1$ predetermined data layers.

In a possible embodiment of the present disclosure, in the case of determining the number K of the currently-scheduled UEs and the number N of the transmission resources multiplexed by the UEs, $K \leq 2^N-1$, and selecting the encoding matrix used when the N transmission resources are multiplexed by the $2^N-1$ predetermined data layers, the selection unit is further configured to: select, in accordance with a plurality of values of n corresponding to a plurality of predetermined to-be-selected encoding matrices, a set of values of n which each meets a condition $K \leq 2^n-1$; select a set of the to-be-selected encoding matrices available for the K UEs from the plurality of to-be-selected encoding matrices in accordance with the set of values of n; and select the number N of the transmission resources which are capable of being currently multiplexed by the K UEs from the set of values of n, and select a to-be-selected encoding matrix corresponding to a value of N from the set of the to-be-selected encoding matrices as the encoding matrix used when the N transmission resources are multiplexed by the $2^N-1$ data layers, where n represents the number of the transmission resources corresponding to a to-be-selected encoding matrix, and the to-be-selected encoding matrix is an encoding matrix used when the N transmission resources are multiplexed by $2^n-1$ data layers.

In a possible embodiment of the present disclosure, in the case of selecting the number N of the transmission resources which are capable of being currently multiplexed by the K UEs from the set of values of n, and selecting the to-be-selected encoding matrix corresponding to the value of N from the set of the to-be-selected encoding matrices as the encoding matrix used when the N transmission resources are multiplexed by the $2^N-1$ data layers, the selection unit is further configured to: select a random value from the set of values of n as the number N of the transmission resources which are capable of being currently multiplexed by the K UEs, the random value being not greater than the number of system-available frequency-domain resources and the corresponding $2^n-1$ predetermined data layers being capable of meeting a load requirement of the K UEs; and select a to-be-selected encoding matrix corresponding to the value of N from the set of the to-be-selected encoding matrices as the encoding matrix used when the N transmission resources are multiplexed by the $2^N-1$ data layers.

In a possible embodiment of the present disclosure, in the case that the processing unit acquires the current data transmission rule, with respect to the mapping relationship between the K UEs and the data layers on the N transmission resources corresponding to the encoding matrix, each UE is mapped to at least one column of the encoding matrix that meets a corresponding transmission requirement parameter in accordance with the transmission requirement parameter of each UE, and each column of the encoding matrix corresponds to one data layer.

In a possible embodiment of the present disclosure, the transmission requirement parameter at least includes a load of each UE, and any one of the following parameters or any combination of the following combinations: signal-to-noise ratio (SNR), block error rate (BER) and power resource.

In a possible embodiment of the present disclosure, in the case that the processing unit acquires the current data transmission rule, each UE is mapped to one column of the encoding matrix that meets the transmission requirement parameter, or mapped to at least two columns of the encoding matrix that have an identical diversity order and meet the transmission requirement parameter, or mapped to at least two columns of the encoding matrix that have different diversity orders and meet the transmission requirement parameter. The diversity order is defined as the number of non-zero elements in each column of the encoding matrix and it is used to represent frequency-domain diversity acquired for data transmission.

In still yet another aspect, the present disclosure provides in some embodiments a UE, including: a processing unit configured to acquire a current data transmission rule, the current data transmission rule including a mapping relationship between currently-scheduled K UEs and data layers on N transmission resources corresponding to a selected encoding matrix, one UE at least occupying one data layer, $K \leq 2^N-1$; and a transmission unit configured to transmit data to a network side in accordance with the current data transmission rule through the at least one data layer occupied by the UE in the encoding matrix.

According to the UE in the embodiments of the present disclosure, in the case of determining the number of the currently-scheduled UEs, various pattern-mapping encoding matrices may be selected flexibly. In addition, one UE is mapped to one or more data layers of the selected encoding matrix, so as to achieve the mapping relationship between multi-user data and the encoding matrix in a flexible manner. In the case that a frequency-domain resource block of a current system is multiplexed by a small amount of users, one UE may be mapped to a plurality of data layers, so it is able to increase a transmission load of the UE, thereby to increase a throughput of the entire system. Further, it is able to reduce a modulation encoding level while ensuring the spectral efficiency, thereby to further reduce algorithm complexity of a receiver.

In a possible embodiment of the present disclosure, prior to acquiring the current data transmission rule, the UE further includes a selection unit configured to: determine from the network side, the number K of the currently-scheduled UEs and the number N of the transmission resources multiplexed by the UEs, $K \leq 2^N-1$; and select an encoding matrix used when the N transmission resources are multiplexed by $2^N-1$ predetermined data layers.

In a possible embodiment of the present disclosure, in the case of determining, from the network side, the number K of the currently-scheduled UEs and the number N of the transmission resources multiplexed by the UEs, $K \leq 2^N-1$, and selecting the encoding matrix used when the N transmission resources are multiplexed by the $2^N-1$ predetermined data layers, the selection unit is further configured to: select, in accordance with a plurality of values of n corresponding to a plurality of predetermined to-be-selected encoding matrices, a set of values of n which each meets a condition $K \leq 2^n-1$; select a set of the to-be-selected encoding matrices available for the K UEs from the plurality of to-be-selected encoding matrices in accordance with the set of values of n; and select the number N of the transmission resources which are capable of being currently multiplexed by the K UEs from the set of values of n, and select a to-be-selected encoding matrix corresponding to a value of N from the set of the to-be-selected encoding matrices as the encoding matrix used when the N transmission resources are multiplexed by the $2^N-1$ data layers, where n represents the number of the transmission resources corresponding to a to-be-selected encoding matrix, and the to-be-selected encoding matrix is an encoding matrix used when the N transmission resources are multiplexed by $2^n-1$ data layers.

In a possible embodiment of the present disclosure, in the case of selecting the number N of the transmission resources which are capable of being currently multiplexed by the K UEs from the set of values of n, and selecting the to-be-selected encoding matrix corresponding to the value of N from the set of the to-be-selected encoding matrices as the encoding matrix used when the N transmission resources are multiplexed by the $2^N-1$ data layers, the selection unit is further configured to: select a random value from the set of values of n as the number N of the transmission resources which are capable of being currently multiplexed by the K UEs, the random value being not greater than the number of system-available frequency-domain resources and the corresponding $2^n-1$ predetermined data layers being capable of meeting a load requirement of the K UEs; and select a to-be-selected encoding matrix corresponding to the value of N from the set of the to-be-selected encoding matrices as the encoding matrix used when the N transmission resources are multiplexed by the $2^N-1$ data layers.

In a possible embodiment of the present disclosure, in the case that the processing unit acquires the current data transmission rule, with respect to the mapping relationship between the K UEs and the data layers on the N transmission resources corresponding to the encoding matrix, each UE is mapped to at least one column of the encoding matrix that meets a corresponding transmission requirement parameter in accordance with the transmission requirement parameter of each UE, and each column of the encoding matrix corresponds to one data layer.

In a possible embodiment of the present disclosure, in the case that the processing unit determines the mapping relationship between the K UEs and the data layers on the N transmission resources corresponding to the encoding matrix, the transmission requirement parameter at least includes a load of each UE, and any one of the following parameters or any combination of the following combinations: signal-to-noise ratio (SNR), block error rate (BER) and power resource.

In a possible embodiment of the present disclosure, in the case that the processing unit acquires the current data transmission rule, each UE is mapped to one column of the encoding matrix that meets the transmission requirement parameter, or mapped to at least two columns of the encoding matrix that have an identical diversity order and meet the transmission requirement parameter, or mapped to at least two columns of the encoding matrix that have different diversity orders and meet the transmission requirement parameter. The diversity order is defined as the number of non-zero elements in each column of the encoding matrix and it is used to represent frequency-domain diversity acquired for data transmission.

In still yet another aspect, the present disclosure provides in some embodiments a UE, including: a processing unit configured to acquire a current data transmission rule, the current data transmission rule including a mapping relationship between currently-scheduled K UEs and data layers on N transmission resources corresponding to a selected encoding matrix, one UE at least occupying one data layer, $K \le 2^{N-1}$; and a reception unit configured to receive feedback data from a network side, the feedback data being fed back by the network side after receiving data transmitted from the UE in accordance with the current data transmission rule.

According to the UE in the embodiments of the present disclosure, in the case of determining the number of the currently-scheduled UEs, various pattern-mapping encoding matrices may be selected flexibly. In addition, one UE is mapped to one or more data layers of the selected encoding matrix, so as to achieve the mapping relationship between multi-user data and the encoding matrix in a flexible manner. In the case that a frequency-domain resource block of a current system is multiplexed by a small amount of users, one UE may be mapped to a plurality of data layers, so it is able to increase a transmission load of the UE, thereby to increase a throughput of the entire system. Further, it is able to reduce a modulation encoding level while ensuring the spectral efficiency, thereby to further reduce algorithm complexity of a receiver.

In a possible embodiment of the present disclosure, prior to acquiring the current data transmission rule, the UE further includes a selection unit configured to: determine from the network side, the number K of the currently-scheduled UEs and the number N of the transmission resources multiplexed by the UEs, $K \le 2^N-1$; and select an encoding matrix used when the N transmission resources are multiplexed by $2^N-1$ predetermined data layers.

In a possible embodiment of the present disclosure, in the case of determining, from the network side, the number K of the currently-scheduled UEs and the number N of the transmission resources multiplexed by the UEs, $K \le 2^N-1$, and selecting the encoding matrix used when the N transmission resources are multiplexed by the $2^N-1$ predetermined data layers, the selection unit is further configured to: select, in accordance with a plurality of values of n corresponding to a plurality of predetermined to-be-selected encoding matrices, a set of values of n which each meets a condition $K \le 2^n-1$; select a set of the to-be-selected encoding matrices available for the K UEs from the plurality of to-be-selected encoding matrices in accordance with the set of values of n; and select the number N of the transmission resources which are capable of being currently multiplexed by the K UEs from the set of values of n, and select a to-be-selected encoding matrix corresponding to a value of N from the set of the to-be-selected encoding matrices as the encoding matrix used when the N transmission resources are multiplexed by the $2^N-1$ data layers, where n represents the number of the transmission resources corresponding to a to-be-selected encoding matrix, and the to-be-selected encoding matrix is an encoding matrix used when the N transmission resources are multiplexed by $2^n-1$ data layers.

In a possible embodiment of the present disclosure, in the case of selecting the number N of the transmission resources which are capable of being currently multiplexed by the K UEs from the set of values of n, and selecting the to-be-selected encoding matrix corresponding to the value of N from the set of the to-be-selected encoding matrices as the encoding matrix used when the N transmission resources are multiplexed by the $2^N-1$ data layers, the selection unit is further configured to: select a random value from the set of values of n as the number N of the transmission resources which are capable of being currently multiplexed by the K UEs, the random value being not greater than the number of system-available frequency-domain resources and the corresponding $2^n-1$ predetermined data layers being capable of meeting a load requirement of the K UEs; and select a to-be-selected encoding matrix corresponding to the value of N from the set of the to-be-selected encoding matrices as the encoding matrix used when the N transmission resources are multiplexed by the $2^N-1$ data layers.

In a possible embodiment of the present disclosure, in the case that the processing unit acquires the current data transmission rule, with respect to the mapping relationship between the K UEs and the data layers on the N transmission resources corresponding to the encoding matrix, each UE is mapped to at least one column of the encoding matrix that meets a corresponding transmission requirement parameter in accordance with the transmission requirement parameter of each UE, and each column of the encoding matrix corresponds to one data layer.

In a possible embodiment of the present disclosure, in the case that the processing unit determines the mapping relationship between the K UEs and the data layers on the N transmission resources corresponding to the encoding matrix, the transmission requirement parameter at least includes a load of each UE, and any one of the following parameters or any combination of the following combinations: signal-to-noise ratio (SNR), block error rate (BER) and power resource.

In a possible embodiment of the present disclosure, in the case that the processing unit acquires the current data transmission rule, each UE is mapped to one column of the encoding matrix that meets the transmission requirement parameter, or mapped to at least two columns of the encoding matrix that have an identical diversity order and meet the transmission requirement parameter, or mapped to at least two columns of the encoding matrix that have different diversity orders and meet the transmission requirement parameter. The diversity order is defined as the number of non-zero elements in each column of the encoding matrix and it is used to represent frequency-domain diversity acquired for data transmission.

BRIEF DESCRIPTION OF THE DRAWINGS

FIGS. 2a, 2b and 2c are schematic views showing mapping modes where two UEs correspond to two transmission resources according to one embodiment of the present disclosure;

DETAILED DESCRIPTION OF THE EMBODIMENTS

A PDMA technology is a technology implemented on the basis of overall optimization of a multi-user communication system and capable of performing joint processing at both a transmitting end and a receiving end. At the transmitting end, users are differentiated from each other in accordance with non-orthogonal characteristic patterns based on a plurality of signal domains, and at the receiving end, multi-user detection is performed using a BP algorithm receiver and an SCI receiver on the basis of a characteristic structure of a user pattern, so as to enable the existing time-frequency radio resources to be multiplexed by the users.

The present disclosure provides in some embodiments a data transmission method, a data reception method, a data transmission device and a data reception device. For the given number of UEs, it is able to select the encoding matrices with different dimensions in a flexible manner, and after the encoding matrix has been determined, a mapping relationship between the UEs and a plurality of data layers on a plurality of transmission resources (frequency-domain transmission resources are involved in the embodiments of the present disclosure) corresponding to the encoding matrix is created. One UE may be mapped to one or more data layers that meet a transmission requirement of the UE, i.e., one UE may occupy one or more columns of the encoding matrix. In the case that a frequency-domain resource block of a current system is multiplexed by a small amount of users, the data layers of the encoding matrix may be used by an identical UE, so it is able to increase a transmission load of the UE, thereby to increase a total transmission load of a system and increase a throughput of the entire system. Further, it is able to reduce a modulation encoding level while ensuring the spectral efficiency, thereby to further reduce algorithm complexity of a receiver.

A network side device involved in the embodiments of the present disclosure may be a base station. The UE involved in the embodiments of the present disclosure may be a wireless terminal, e.g., a mobile phone.

The present disclosure will be described hereinafter in more details in conjunction with the drawings and embodiments.

The data transmission method and the data reception method in the embodiments of the present disclosure may be applied to a downlink or an uplink. The methods may be adopted by the network side for the transmission of downlink data or uplink data individually. The methods may be adopted by the UE for the transmission of downlink data or uplink data individually. Of course, the methods may be adopted by the network side and the UE within an identical time period for the interaction of the uplink and downlink data simultaneously.

Figure 1A:
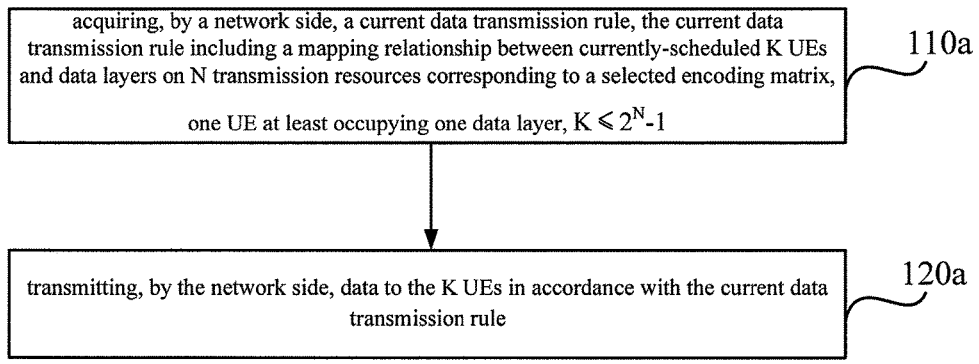
FIGS. 1a and 1c are flow charts of a data transmission method according to one embodiment of the present disclosure.

As shown in FIG. 1a, the present disclosure provides in some embodiments a data transmission method which includes the following steps.

At a pre-processing stage, the network side device may determine the number K of currently-scheduled UEs and the number N of transmission resources multiplexed by the UEs, and determine an encoding matrix (a first encoding matrix) in the case that the N transmission resources are multiplexed by $2^N-1$ predetermined data layers, where $K \leq 2^N-1$.

In actual application, the network side device may determine the number (K) of the currently-scheduled UEs that have participated in the multiplexing of the transmission resources, and select an available to-be-selected encoding matrix for the K UEs. Theoretically, there may be various encoding matrices available for the K UEs, and the available encoding matrix may be selected through the following steps.

Step S1: selecting, by the network side in accordance with a plurality of values of n corresponding to a plurality of predetermined to-be-selected encoding matrices, a set of values of n which each meets a condition $K \leq 2^n-1$, where n represents the number of the transmission resources corresponding to a to-be-selected encoding matrix, and the to-be-selected encoding matrix is an encoding matrix used when the number of the UEs that multiplex the plurality of transmission resources has a theoretical maximum value (i.e., $2^n-1$) on the basis of a principle where multi-UE encoding modes are capable of being differentiated from each other, i.e., an encoding matrix used when the N transmission resources are multiplexed by $2^n-1$ data layers.

$H_{PDMA}^{(N,M)}$ represents an N*M encoding matrix, N represents the number of rows of $H_{PDMA}^{(N,M)}$, each row of $H_{PDMA}{}^{(N,M)}$ corresponds to one transmission resource (i.e., N represents the number of the transmission resources for $H_{PDMA}{}^{(N,M)}$), M represents the number of columns of $H_{PDMA}{}^{(N,M)}$, and each column represents one data layer (i.e., M represents the number of data layers for $H_{PDMA}{}^{(N,M)}$).

For example, three to-be-selected encoding matrices $H_{PDMA}{}^{(2,3)}$, $H_{PDMA}{}^{(3,7)}$ and $H_{PDMA}{}^{(4,15)}$ may be preconfigured by the transmitting end, and the values of n corresponding to these encoding matrices are 2, 3 and 4. In the case that K=2, the set of values of n that meet the condition $K \leq 2^n-1$ may be {2, 3, 4}, in the case that K=3, the set of values of n that meet the condition $K \leq 2^n-1$ may be {2, 3, 4}, and in the case that K=4, the set of values of n that meet the condition $K \leq 2^n-1$ may be {3, 4}. Of course, any other to-be-selected encoding matrices may be set.

Step S2: selecting a set of the to-be-selected encoding matrices available for the K UEs from the plurality of to-be-selected encoding matrices in accordance with the set of values of n.

The number N of the transmission resources that are capable of being currently multiplexed by the K UEs may be selected from the set of values of n, and a to-be-selected encoding matrix corresponding to the value of N may be selected from the set of to-be-selected matrices as the first encoding matrix.

To be specific, a random value may be selected from the set of values of n as the number N of the transmission resources which are capable of currently multiplexed by the K UEs. This random value may be not greater than the number of system-available frequency-domain resources, and the corresponding $2^n-1$ predetermined data layers may be capable of meeting a load requirement of the K UEs. Then, a to-be-selected encoding matrix corresponding to the value of N may be selected from the set of the to-be-selected encoding matrices as the first encoding matrix.

Referring to formula (1), the value of N, i.e., the number of the rows of the encoding matrix, may present the number of the transmission resources multiplexed by the UEs. M may have a theoretical maximum value of 2N-1, and the number K of the UEs which are capable of multiplexing the N transmission resources may be not greater than the theoretical maximum value. The number of the transmission resources that are capable of being currently multiplexed by the K UEs may be selected according to the practical need, as long as the encoding matrices corresponding to the number of the transmission resources which meets the condition $K \leq 2^N-1$ can be used to achieve the pattern mapping for the K UEs. A random value may be selected from the set of values of the number of the transmission resources that meets the condition as the number of the transmission resources multiplexed by the K UEs.

Step 110a: acquiring, by the network side, a current data transmission rule, the current data transmission rule including a mapping relationship between the currently-scheduled K UEs and the data layers on the N transmission resources corresponding to the selected encoding matrix, one UE at least occupying one data layer, and $K \leq 2^N-1$.

The number N of the transmission resources capable of being currently multiplexed by the currently-scheduled K UEs and the first encoding matrix formed in the case that the N transmission resources are multiplexed by the $2^N-1$ predetermined data layers have been determined at the preprocessing stage.

Because the number K of the UEs capable of multiplexing the transmission resources meets the condition $K \leq 2^N-1$, a mapping relation may be created between at least one column of the first encoding matrix and the respective UEs, and then the total number of the columns of the encoding matrix occupied by the K UEs may be determined in accordance with the column corresponding to each UE and the columns occupied by each UE. This total number of the columns of the encoding matrix may be all the columns of the first encoding matrix, i.e., $2^N-1$ columns, or some of the columns of the first encoding matrix. The encoding matrix (a second encoding matrix) formed in the case that the N transmission resources are multiplexed by the K UEs may be determined in accordance with the column corresponding to each UE and the total number of the columns occupied by the K UEs. This second encoding matrix may be just a sub-matrix of the first encoding matrix, and it may be selected in accordance with the current data transmission rule. In the embodiments of the present disclosure, a subject that has created the data transmission rule will not be particularly defined. The data transmission rule may be created through negotiation between the network side and the UE, or prescribed in accordance with a protocol. The data transmission rule may be created as follows.

At first, the mapping relationship between each UE and at least one column of the first encoding matrix that meets a transmission requirement parameter may be created in accordance with the data transmission parameter of each UE. Each column of the encoding matrix corresponds to one data layer, and a diversity order (i.e., a column weight) is defined as the number of non-zero elements in each column of the encoding matrix and it is used to represent frequency-domain diversity acquired for the data transmission. The transmission requirement parameter at least includes a load of each UE, and any one of the following parameters or any combination of the following combinations: signal-to-noise ratio (SNR), block error rate (BER) and power resource.

In the case of creating the mapping relationship, the number of columns of the encoding matrix occupied by each UE must meet its load requirement. For example, the UE with a smaller load may occupy fewer columns of the encoding matrix, and the UE with a larger load may occupy more columns of the encoding matrix.

In addition, in the case of creating the mapping relationship between each UE and at least one column of the encoding matrix, the mapping relation may be created between each UE and one column of the encoding matrix that meets the transmission requirement parameter, or between each UE and at least two columns of the encoding matrix that have an identical diversity order and meet the transmission requirement parameter, or between each UE and at least two columns of the encoding matrix that have different diversity orders and meet the transmission requirement parameter. In other words, in the case that one UE is mapped to more than one column that meets the transmission requirement parameter of the UE, the data layers in the selected columns may have an identical diversity order or different diversity orders.

Next, the total number L of columns occupied by the K UEs and the second encoding matrix formed in the case that the N transmission resources are multiplexed by the K UEs may be determined in accordance with the column corresponding to each UE and the number of columns occupied by each UE.

During the determination of the second encoding matrix formed in the case that the N transmission resources are multiplexed by the K UEs, the K UEs may be mapped to L data layers, i.e., the K UEs may occupy L columns of the first encoding matrix. In the case that L=K, each of the K UEs may occupy one data layer. In the case that L>K, a certain one of the K UEs may occupy more than one data layers. In other words, according to the method for mapping the multi-UE data to the encoding matrix in the embodiments of the present disclosure, it is able to map one UE to more than one columns of the encoding matrix, thereby to increase a size of an encoding block for the data transmission and improve the throughput of the entire system.

In the embodiments of the present disclosure, through the mapping relationship between the K UEs and the plurality of data layers on the N transmission resources corresponding to the first encoding matrix, it is able to map one UE to one or more data layers. As compared with the conventional PDMA technology where one UE is merely mapped to one data layer, it is able to improve the entire performance of the system.

To facilitate the subsequent description, the load will be defined herein. A system load may be defined as the total number of data layers occupied by all the UEs on a unit transmission resource (i.e., a transmission resource block). For example, for the conventional orthogonal transmission, different UEs may occupy different transmission resources, and the total number of data layers occupied by all the UEs on the unit transmission resource may be 1, i.e., the system load may be 1. For another example, for the conventional PDMA technology, in the case that the number of the UEs that multiplex the N transmission resources is M, each of the M UEs may occupy one data layer, so the system load may be M/N. In the case that the number of the UEs that multiplex two transmission resources is 3, the total number of the data layers occupied by all the UEs on the unit transmission resource may be 3/2, i.e., the system load may be 3/2. A transmission load of each UE may be defined as the number of data layers occupied by the UE on a unit transmission resource (i.e., a transmission resource block). For example, in the case that Lk columns are occupied by the UE on the N transmission resources, the load of the UE may be Lk/N.

As mentioned in the preprocessing stage, L columns of the first encoding matrix formed in the case that the theoretical maximum number (i.e., $2^N-1$) of the data layers multiplex the N transmission resources may be selected to form a sub-matrix of the first encoding matrix. At this time, there may be a plurality of sub-matrices that meet a condition $K \leq L \leq 2^N-1$. A random one of the plurality of sub-matrices may be selected as the second encoding matrix formed in the case that the N transmission resources are multiplexed by the K UEs.

In the case that L=K, a multi-UE pattern mapping method for the conventional PDMA technology may be adopted, i.e., one UE may be mapped to one data layer, and the system load may be L/N which is equal to K/N. In the case that L>K, one UE may be mapped to a plurality of data layers, the system load may be L/N which is greater than K/N.

Obviously, in the case that one UE is capable of being mapped to a plurality of data layers, it is able to increase the transmission load of the UE. In the case that a small amount of UEs multiplex a frequency-domain resource block of a current system, it is able to increase the throughput of the entire system.

To be specific, an identical time-frequency block multiplexed by the currently-scheduled K UEs has a size of $N_{sc}^{PDMA} \times N_{symb}^{PDMA}$, where $N_{sc}^{PDMA}$ represents the number of sub-carriers of the time-frequency resource, and $N_{symb}^{PDMA}$ represents the number of OFDM symbols. In the case that the time-frequency resource block is divided evenly into N transmission resources, the number of Resource Elements (REs) of each transmission resource (i.e., a size of an admissible encoding block for encoding modulation symbols) may be $N_{sc}^{PDMA} \times N_{symb}^{PDMA}/N$. In the case that the currently-scheduled K UEs are mapped to the L data layers on the N transmission resources corresponding to the second encoding matrix and L>K, the size of the encoding block transmitted by each UE mapped onto the plurality of data layers (i.e., the number of the data layers is LK) may increase to $N_{sc}^{PDMA} \times N_{symb}^{PDMA} \cdot L_k/N$ on the time-frequency resource with the size of $N_{sc}^{PDMA} \times N_{symb}^{PDMA}$, so it is able to increase the load of the UE, i.e., the maximum admissible throughput. In addition, it is able to reduce a modulation encoding level while ensuring spectral efficiency, thereby to reduce the receiver algorithm complexity.

Step 120a: transmitting, by the network side, data to the K UEs in accordance with the current data transmission rule.

Figure 1B:
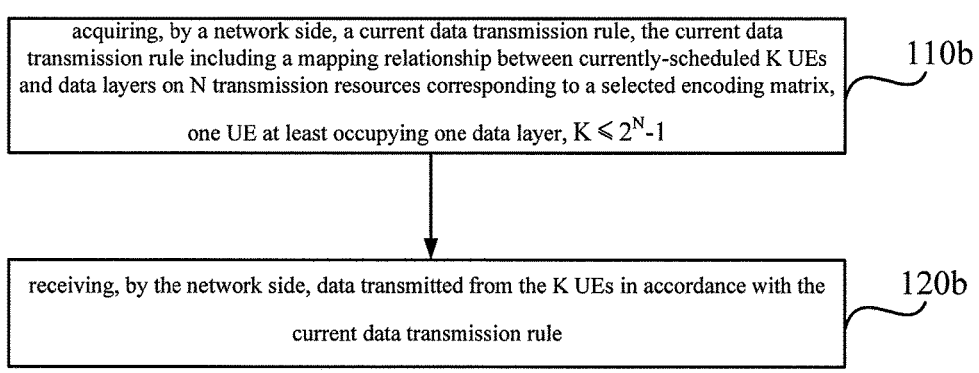
FIGS. 1b and 1d are flow charts of a data reception method according to one embodiment of the present disclosure.

Based on an identical inventive concept, as shown in FIG. 1b, the present disclosure provides in some embodiments a data reception method which includes: Step 110b of acquiring, by a network side, a current data transmission rule, the current data transmission rule including a mapping relationship between currently-scheduled K UEs and data layers on N transmission resources corresponding to a selected encoding matrix, one UE at least occupying one data layer, $K \leq 2^N-1$; and Step 120b of receiving, by the network side, data transmitted from the K UEs in accordance with the current data transmission rule.

The data reception method is identical to the data transmission method in FIG. 1a in terms of the inventive concept, and thus will not be particularly defined herein.

Figure 1C:
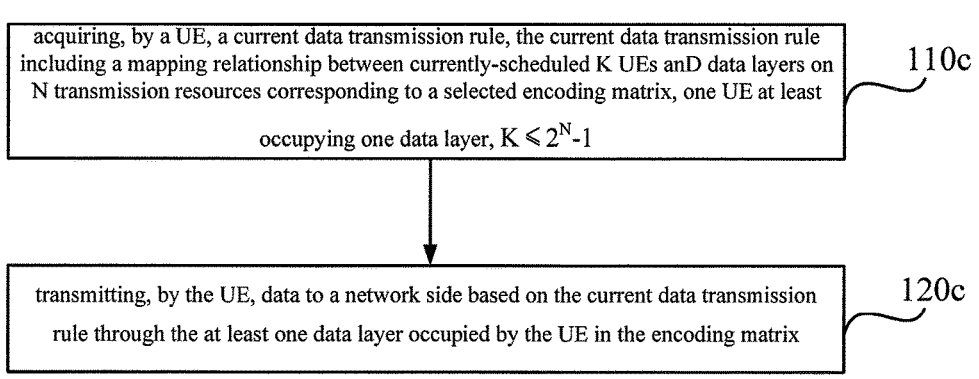

Based on an identical inventive concept, as shown in FIG. 1c, the present disclosure further provides in some embodiments another data transmission method which includes the following steps.

At first, a UE may determine from a network side, the number K of currently-scheduled UEs and the number N of transmission resources multiplexed by the UEs ($K \leq 2^N-1$), and select an encoding matrix used when the N transmission resources are multiplexed by $2^N-1$ predetermined data layers. The encoding matrix may be selected by the network side and then notified to the UE, or directly selected by the UE that has met a configuration requirement.

Step S110c: acquiring, by the UE, a current data transmission rule, the current data transmission rule including a mapping relationship between the currently-scheduled K UEs and the data layers on the N transmission resources corresponding to the selected encoding matrix, one UE at least occupying one data layer, $K \leq 2^N-1$.

Step 120c: transmitting, by the UE, data to a network side in accordance with the current data transmission rule through the at least one data layer occupied by the UE in the encoding matrix.

The data transmission method is identical to the data transmission method in FIG. 1b in terms of the inventive concept, and thus will not be particularly defined herein.

Figure 1D:
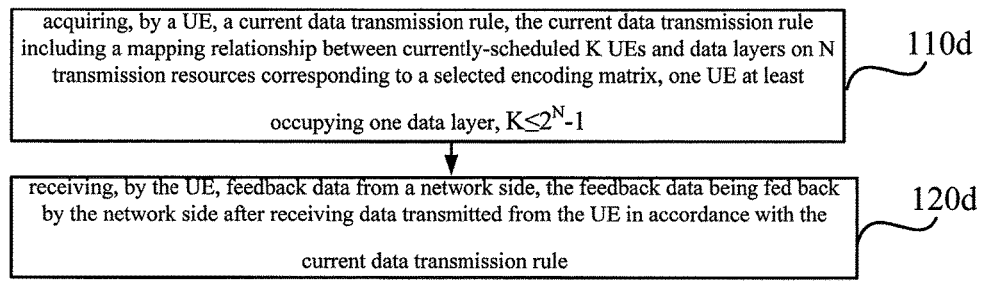

Based on an identical inventive concept, as shown in FIG. 1d, the present disclosure further provides in some embodiments another data reception method which includes the following steps.

At first, a UE may determine the number K of currently-scheduled UEs and the number N of transmission resources multiplexed by the UEs ($K \leq 2^N-1$) indicated by a network side, and select an encoding matrix used when the N transmission resources are multiplexed by $2^N-1$ predetermined data layers. The encoding matrix may be selected by the network side and then notified to the UE, or directly selected by the UE that has met a configuration requirement.

Step 110d: acquiring, by the UE, a current data transmission rule, the current data transmission rule including a mapping relationship between the currently-scheduled K UEs and data layers on the N transmission resources corresponding to the selected encoding matrix, one UE at least occupying one data layer, $K \leq 2^N - 1$.

Step 120d: receiving, by the UE, feedback data from a network side, the feedback data being fed back by the network side after receiving data transmitted from the UE in accordance with the current data transmission rule.

The data reception method is identical to the data transmission method in FIG. 1a in terms of the inventive concept, and thus will not be particularly defined herein.

As mentioned above, the subject that has created the current data transmission rule is not particularly defined in the embodiments of the present disclosure. In the case that the current data transmission rule is created by the network side, the network side may transit the data to the corresponding UE in accordance with the mapping relationship contained in the current data transmission rule and on the basis of the data layer occupied by each UE, or instruct the UE to transmit the data to the network side on the data layer occupied by the UE in accordance with the current data transmission rule. The UE may, in the case that the network side has instructed the UE to use the N transmission resources, determine the data layer (one or more columns) occupied thereby in accordance with the predetermined data transmission rule, and transmit the data to the network side on the data layer occupied thereby. The network side may receive the data transmitted from the UE in accordance with the data transmission rule.

The present disclosure will be described hereinafter in more details in conjunction with specific application scenarios.

Presumed that to-be-selected encoding matrices $H_{PDMA}^{(2,3)}$, $H_{PDMA}^{(3,7)}$ and $H_{PDMA}^{(4,15)}$ are preconfigured by the system, and values of the number n of the transmission resources may be 2, 3 and 4.

Example 1 in the case that the number K of the UEs capable of multiplexing the n transmission resources is 2, the method for allocating the transmission resources for the two UEs will be described hereinafter.

At first, an encoding matrix formed in the case that the N transmission resources are multiplexed by the two UEs may be determined. Next, a mapping relationship between the two UEs and the encoding matrix may be created.

To be specific, the values of n that meet the condition $K \leq 2^n - 1$ may be 2, 3 and 4, so a set of to-be-selected encoding matrices available for the two UEs may be $\{H_{PDMA}^{(2,3)}, H_{PDMA}^{(3,7)}, H_{PDMA}^{(4,15)}\}$, i.e., all the to-be-selected encoding matrices configured by the system have met the selection condition.

In the case that the value of n is 2, i.e., in the case that the to-be-selected encoding matrix is $H_{PDMA}^{(2,3)}$, two transmission resources may be multiplexed by the two UEs. Two or three columns of $H_{PDMA}^{(2,3)}$ may be selected so as to form the second encoding matrix used when the two transmission resources are multiplexed by the two UEs. Then, the following mapping relationships may be created between the two UEs and the two or three columns of data layers on the two transmission resources corresponding to $H_{PDMA}^{(2,3)}$.

Figure 2A:
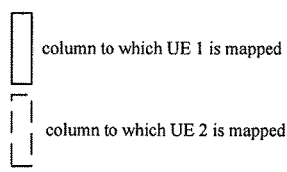

For example, as shown in FIG. 2a, a first column of $H_{PDMA}^{(2,3)}$ may be occupied by a UE 1, and a second column of $H_{PDMA}^{(2,3)}$ may be occupied by a UE 2.

For another example, as shown in FIG. 2b, the first column of $H_{PDMA}^{(2,3)}$ may be occupied by the UE 1, and the second column and a third column of $H_{PDMA}^{(2,2)}$ may be occupied by the UE 2. In this case, merely one data layer of $H_{PDMA}^{(2,3)}$ is occupied by the UE 1, and two data layers of $H_{PDMA}^{(2,3)}$ is occupied by the UE 2. In the case that the UE 1 and the UE 2 adopt an identical modulation encoding mode and have an identical encoding rate, a peak throughput of the UE 2 may be twice that of the UE 1. The UE 1 may have a load of 1/2, the UE 2 may have a load of 2/2, and the system load may be 3/2. As compared with the conventional PDMA technology where one UE is mapped to merely one data layer, the system load may be incremented by 50%.

For yet another example, as shown in FIG. 2c, the second column of $H_{PDMA}^{(2,3)}$ may be occupied by the UE 1, and the third column of $H_{PDMA}^{(2,3)}$ may be occupied by the UE 2. In this case, the data transmission is equivalent to the orthogonal transmission in the related art.

Of course, in some other embodiments of the present disclosure, the first column of $H_{PDMA}^{(2,3)}$ may be occupied by the UE 1 and the third column of $H_{PDMA}^{(2,3)}$ may be occupied by the UE 2, or any other mapping modes may also be adopted, which will not be particularly defined herein.

It can be seen that, there are various modes for mapping the K UEs to the data layers on the plurality of transmission resources corresponding to the encoding matrix, and they may be selected in accordance with the transmission requirement parameter of the UEs. For example, in the case that a load for one UE is 2/2, this UE must be mapped to two data layers (two columns of the encoding matrix).

In the case that the value of n is 3, i.e., in the case that the to-be-selected encoding matrix is $H_{PMDA}^{(3,7)}$, three transmission resources may be multiplexed by the two UEs. Two, three, four, five, six or seven columns that meet the transmission requirement parameter of the two UEs may be selected from $H_{PDMA}^{(3,7)}$, so as to form the second encoding matrix used when the three transmission resources are multiplexed by the two UEs. Then, the following mapping relationships may be created between the two UEs and the selected data layers on the three transmission resources corresponding to $H_{PDMA}^{(3,7)}$.

Figure 3:
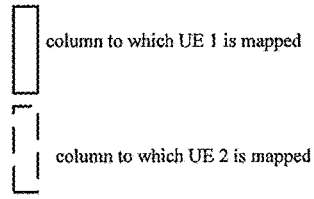
FIG. 3 is a schematic view showing a mapping mode where two UEs correspond to three transmission resources according to one embodiment of the present disclosure.

For example, as shown in FIG. 3, second to fourth columns of $H_{PDMA}^{(3,7)}$ may be occupied by the UE 1, and fifth to seventh columns of $H_{PDMA}^{(3,7)}$ may be occupied by the UE 2, i.e., the later six columns of $H_{PDMA}^{(3,7)}$ may be selected to from the second encoding matrix used when the three transmission resources are multiplexed by the two UEs. In this case, three data layers of $H_{PDMA}^{(3,7)}$ may be occupied by each of the UE 1 and the UE 2. In the case that the UE 1 and the UE 1 adopt an identical modulation encoding mode and have an identical encoding rate, the UE 1 and the UE 2 may transmit an identical data volume, i.e., they may have an identical peak throughput. The UE 1 may have a load of 3/3, the UE 2 may have a load of 3/3, and the system load may be 6/3. As compared with the conventional PDMA technology where one UE is mapped to merely one data layer, the system load may be incremented by 100%.

Of course, in some other embodiments of the present disclosure, the UE 1 and the UE 2 may adopt an identical number of, or different numbers of, data layers of $H_{PDMA}^{(3,7)}$, and there may be various mapping modes, which will not be particularly defined herein.

In the case that the value of n is 4, i.e., the to-be-selected encoding matrix is $H_{PDMA}^{(4,15)}$, four transmission resources may be multiplexed by the two UEs. Two, three, . . . , fourteen or fifteen columns of $H_{PDMA}^{(4,15)}$ that meet the transmission requirement parameter of the two UEs may be selected, so as to form the second encoding matrix used when the four transmission resources are multiplexed by the two UEs. Then, the following mapping relationships may be created between the two UEs and the data layers on the four transmission resources corresponding to $H_{PDMA}^{(4,15)}$.

Figure 4:
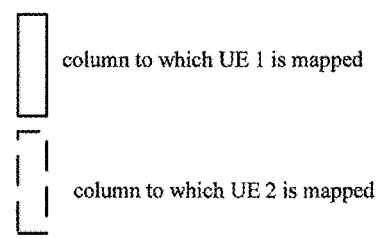
FIG. 4 is a schematic view showing a mapping mode where two UEs correspond to four transmission resources according to one embodiment of the present disclosure.

For example, as shown in FIG. 4, third to seventh columns of $H_{PDMA}^{(4,15)}$ may be occupied by the UE 1, and eighth to fourteenth columns of $H_{PDMA}^{(4,15)}$ may be occupied by the UE 2, i.e the third to fourteenth columns of $H_{PDMA}^{(4,15)}$ may be selected to form the second encoding matrix used when the four transmission resources are multiplexed by the two UEs. In this case, five data layers of $H_{PDMA}^{(4,15)}$ may be occupied by the UE 1, and seven data layers of $H_{PDMA}^{(4,15)}$ may be occupied by the UE 2. In the case that the UE 1 and the UE 2 adopt an identical modulation encoding mode and have an identical encoding rate, the data volume capable of being transmitted by the UE 2 is greater than the data volume capable of being transmitted by the UE 1. The UE 1 may have a load of 5/4, the UE 2 may have a load of 7/4, and the system load may be 12/4. As compared with the conventional PDMA technology where one UE is mapped to merely one data layer, the system load may be incremented by 200%.

Example 2 in the case that the number K of the UEs capable of multiplexing the n transmission resources is 3, the method for allocating the transmission resources for the three UEs will be described hereinafter.

At first, an encoding matrix formed in the case that the N transmission resources are multiplexed by the two UEs may be determined. Next, a mapping relationship between the two UEs and the encoding matrix may be created.

To be specific, the values of n that meet the condition $K \leq 2^n - 1$ may be 2, 3 and 4, so a set of to-be-selected encoding matrices available for the three UEs may be $\{H_{PDMA}^{(2,3)}, H_{PDMA}^{(3,7)}, H_{PDMA}^{(4,15)}\}$, i.e., all the to-be-selected encoding matrices configured by the system have met the selection condition.

Figure 5:
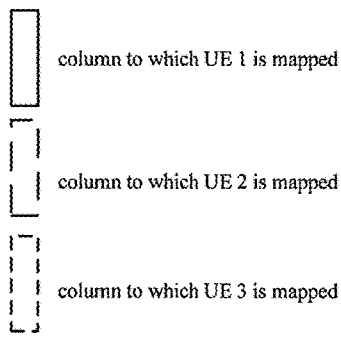
FIGS. 5 and 6 are schematic views showing different pattern mapping modes in the case that the transmission resources are multiplexed by three UEs according to one embodiment of the present disclosure.

In the case that the value of n is 2, i.e., in the case that the to-be-selected encoding matrix is $H_{PDMA}^{(2,3)}$ two transmission resources may be multiplexed by the three UEs. Merely three columns of $H_{PDMA}^{(2,3)}$ may be selected so as to form the second encoding matrix used when the two transmission resources are multiplexed by the three UEs. As shown in FIG. 5, a mapping relationships may be created between the three UEs and the three columns of data layers on the two transmission resources corresponding to $H_{PDMA}^{(2,3)}$.

In the case that the value of n is 3, i.e., in the case that the to-be-selected encoding matrix is $H_{PDMA}^{(3,7)}$, three transmission resources may be multiplexed by the three UEs. Three, four, five, six or seven columns that meet the transmission requirement parameter of the two UEs may be selected from $H_{HPDMA}^{(3,7)}$ so as to form the second encoding matrix used when the three transmission resources are multiplexed by the three UEs. Then, the mapping relationships may be created between the three UEs and the selected data layers on the three transmission resources corresponding to $H_{PDMA}^{(3,7)}$.

Figure 6:
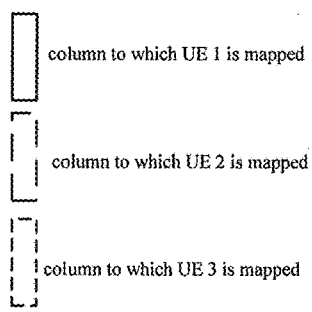

For example, as shown in FIG. 6, a first column of $H_{PDMA}^{(3,7)}$ may be occupied by the UE 1, second to fourth columns of $H_{PDMA}^{(3,7)}$ may be occupied by the UE 2, and fifth to seventh columns of $H_{PDMA}^{(3,7)}$ may be occupied by a UE 3, i.e., $H_{PDMA}^{(3,7)}$ may be selected as the second encoding matrix used when the three transmission resources are multiplexed by the three UEs. In this case, one data layer of $H_{PDMA}^{(3,7)}$ may be occupied by the UE 1, and three data layers of $H_{PDMA}^{(3,7)}$ may be occupied by each of the UE 2 and the UE 3. The UE 1 may have a load of 1/3, the UE 2 and the UE 3 may each have a load of 3/3, and the system load may be 7/3. As compared with the conventional PDMA technology where one UE is mapped to merely one data layer, the system load may be incremented by 133.3%.

Of course, the UE 1, the UE 2 and the UE 3 may each occupy one or more data layers of $H_{PDMA}^{(3,7)}$ and there may be various mapping modes, which will not be particularly defined herein.

In the case that the value of n is 4, i.e., the to-be-selected encoding matrix is $H_{PDMA}^{(4,15)}$ four transmission resources may be multiplexed by the three UEs. Three, four, . . . , or fifteen columns of $H_{PDMA}^{(4,15)}$ that meet the transmission requirement parameter of the three UEs may be selected so as to form the second encoding matrix used when the four transmission resources are multiplexed by the three UEs. Then, the mapping relationships between the three UEs and the selected data layers on the four transmission resources corresponding to $H_{PDMA}^{(4,15)}$ may be created, and a method for creating the mapping relationships will not be particularly defined herein.

Example 3 in the case that the number K of the UEs capable of multiplexing the n transmission resources is 4, the method for allocating the transmission resources for the four UEs will be described hereinafter.

At first, an encoding matrix formed in the case that the N transmission resources are multiplexed by the four UEs may be determined. Next, a mapping relationship between the four UEs and the encoding matrix may be created.

To be specific, the values of n that meet the condition $K \leq 2^n - 1$ may be 3 and 4, so a set of to-be-selected encoding matrices available for the three UEs and selected from the to-be-selected encoding matrices preconfigured by the system may be $\{H_{PDMA}^{(3,7)}, H_{PDMA}^{(4,15)}\}$. Depending on the values of n, a corresponding first encoding matrix may be selected, and then columns of the first encoding matrix that meet the selection condition may be selected to from the second encoding matrix. Then, the mapping relationships between the four UEs and the second encoding matrix may be created, and a method for creating the mapping relationships will not be particularly defined herein.

During the above procedure, the number of the data layers of the first encoding matrix to which the K UEs are mapped may be selected in accordance with a predetermined criterion. The criterion may be set in accordance with the practical experience and then updated and optimized at any time. For example, the number of the data layers occupied by each UE may meet its load requirement, i.e., the UE with a small load may occupy a small amount of data layers, and the UE with a large load may occupy a large number of data layers. Usually, the high load of the UE may result in a high SNR. With respect to the UE with a higher BER requirement, the data transmission may be performed through a transmission layer corresponding to the column with a higher diversity order.

Figure 7A:
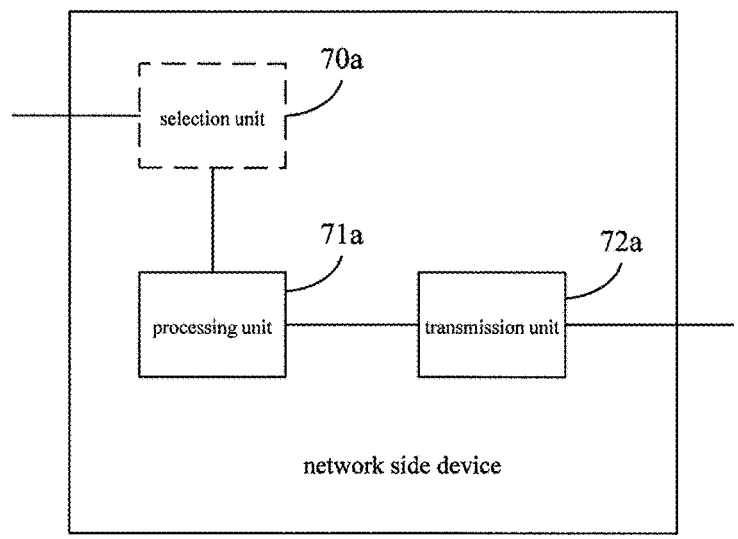
FIGS. 7a, 7b, 8a and 8b are schematic views showing a network side device according to one embodiment of the present disclosure.

Based on an identical inventive concept, the present disclosure further provides in some embodiments a network side device which, as shown in FIG. 7a, includes: a processing unit 71a configured to acquire a current data transmission rule, the current data transmission rule including a mapping relationship between currently-scheduled K UEs and data layers on N transmission resources corresponding to a selected encoding matrix, one UE at least occupying one data layer, $K \leq 2^N-1$; and a transmission unit 72a configured to transmit data to the K UEs in accordance with the current data transmission rule.

According to the network side device in the embodiments of the present disclosure, in the case of determining the number of the currently-scheduled UEs, various pattern-mapping encoding matrices may be selected flexibly. In addition, one UE is mapped to one or more data layers of the selected encoding matrix, so as to achieve the mapping relationship between multi-user data and the encoding matrix in a flexible manner. In the case that a frequency-domain resource block of a current system is multiplexed by a small amount of users, one UE may be mapped to a plurality of data layers, so it is able to increase a transmission load of the UE, thereby to increase a throughput of the entire system. Further, it is able to reduce a modulation encoding level while ensuring the spectral efficiency, thereby to further reduce algorithm complexity of a receiver.

In a possible embodiment of the present disclosure, the network side device further includes a selection unit 70a configured to: prior to acquiring the current data transmission rule, determine the number K of the currently-scheduled UEs and the number N of the transmission resources multiplexed by the UEs, $K \leq 2^N-1$; and select an encoding matrix used when the N transmission resources are multiplexed by $2^N-1$ predetermined data layers.

In a possible embodiment of the present disclosure, in the case of determining the number K of the currently-scheduled UEs and the number N of the transmission resources multiplexed by the UEs, $K \leq 2^N-1$, and selecting the encoding matrix used when the N transmission resources are multiplexed by the $2^N-1$ predetermined data layers, the selection unit 70a is further configured to: select, in accordance with a plurality of values of n corresponding to a plurality of predetermined to-be-selected encoding matrices, a set of values of n which each meets a condition $K \leq 2^n-1$; select a set of the to-be-selected encoding matrices available for the K UEs from the plurality of to-be-selected encoding matrices in accordance with the set of values of n; and select the number N of the transmission resources which are capable of being currently multiplexed by the K UEs from the set of values of n, and select a to-be-selected encoding matrix corresponding to a value of N from the set of the to-be-selected encoding matrices as the encoding matrix used when the N transmission resources are multiplexed by the $2^N-1$ data layers, where n represents the number of the transmission resources corresponding to a to-be-selected encoding matrix, and the to-be-selected encoding matrix is an encoding matrix used when the N transmission resources are multiplexed by $2^n-1$ data layers.

In a possible embodiment of the present disclosure, in the case of selecting the number N of the transmission resources which are capable of being currently multiplexed by the K UEs from the set of values of n, and selecting the to-be-selected encoding matrix corresponding to the value of N from the set of the to-be-selected encoding matrices as the encoding matrix used when the N transmission resources are multiplexed by the $2^N-1$ data layers, the selection unit 70a is further configured to: select a random value from the set of values of n as the number N of the transmission resources which are capable of being currently multiplexed by the K UEs, the random value being not greater than the number of system-available frequency-domain resources and the corresponding $2^n-1$ predetermined data layers being capable of meeting a load requirement of the K UEs; and select a to-be-selected encoding matrix corresponding to the value of N from the set of the to-be-selected encoding matrices as the encoding matrix used when the N transmission resources are multiplexed by the $2^N-1$ data layers.

In a possible embodiment of the present disclosure, in the case that the processing unit 71a acquires the current data transmission rule, with respect to the mapping relationship between the K UEs and the data layers on the N transmission resources corresponding to the encoding matrix, each UE is mapped to at least one column of the encoding matrix that meets a corresponding transmission requirement parameter in accordance with the transmission requirement parameter of each UE, and each column of the encoding matrix corresponds to one data layer.

In a possible embodiment of the present disclosure, in the case that the processing unit 71a determines the mapping relationship between the K UEs and the data layers on the N transmission resources corresponding to the encoding matrix, the transmission requirement parameter at least includes a load of each UE, and any one of the following parameters or any combination of the following combinations: signal-to-noise ratio (SNR), block error rate (BER) and power resource.

In a possible embodiment of the present disclosure, in the case that the processing unit 71a acquires the current data transmission rule, each UE is mapped to one column of the encoding matrix that meets the transmission requirement parameter, or mapped to at least two columns of the encoding matrix that have an identical diversity order and meet the transmission requirement parameter, or mapped to at least two columns of the encoding matrix that have different diversity orders and meet the transmission requirement parameter. The diversity order is defined as the number of non-zero elements in each column of the encoding matrix and it is used to represent frequency-domain diversity acquired for data transmission.

Figure 7B:
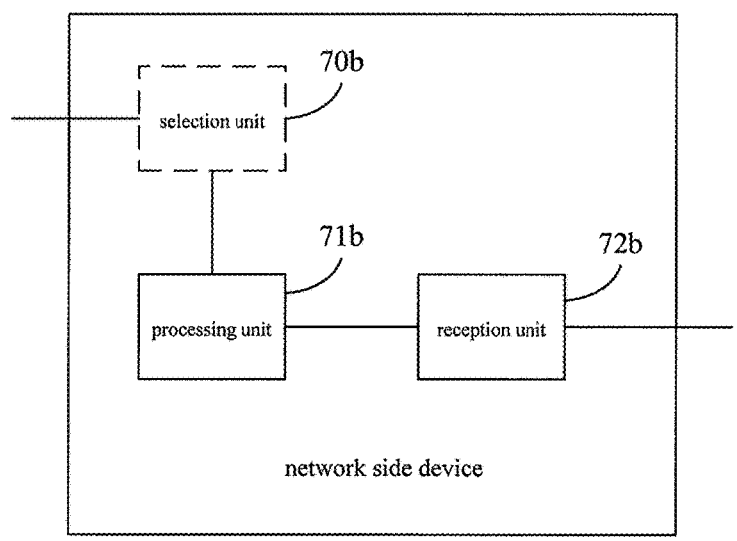

The present disclosure provides in some embodiments another network side device which, as shown in FIG. 7b, includes: a processing unit 71b configured to acquire a current data transmission rule, the current data transmission rule including a mapping relationship between currently-scheduled K UEs and data layers on N transmission resources corresponding to a selected encoding matrix, one UE at least occupying one data layer, $K \leq 2^N-1$; and a reception unit 72b configured to receive data transmitted from the K UEs in accordance with the current data transmission rule.

According to the network side device in the embodiments of the present disclosure, in the case of determining the number of the currently-scheduled UEs, various pattern-mapping encoding matrices may be selected flexibly. In addition, one UE is mapped to one or more data layers of the selected encoding matrix, so as to achieve the mapping relationship between multi-user data and the encoding matrix in a flexible manner. In the case that a frequency-domain resource block of a current system is multiplexed by a small amount of users, one UE may be mapped to a plurality of data layers, so it is able to increase a transmission load of the UE, thereby to increase a throughput of the entire system. Further, it is able to reduce a modulation encoding level while ensuring the spectral efficiency, thereby to further reduce algorithm complexity of a receiver.

In a possible embodiment of the present disclosure, the network side device further includes a selection unit 70b configured to: prior to acquiring the current data transmission rule, determine the number K of the currently-scheduled UEs and the number N of the transmission resources multiplexed by the UEs, $K \leq 2^N-1$; and select an encoding matrix used when the N transmission resources are multiplexed by $2^N-1$ predetermined data layers.

In a possible embodiment of the present disclosure, in the case of determining the number K of the currently-scheduled UEs and the number N of the transmission resources multiplexed by the UEs, $K \le 2^N-1$, and selecting the encoding matrix used when the N transmission resources are multiplexed by the $2^N-1$ predetermined data layers, the selection unit 70b is further configured to: select, in accordance with a plurality of values of n corresponding to a plurality of predetermined to-be-selected encoding matrices, a set of values of n which each meets a condition $K \le 2^n-1$; select a set of the to-be-selected encoding matrices available for the K UEs from the plurality of to-be-selected encoding matrices in accordance with the set of values of n; and select the number N of the transmission resources which are capable of being currently multiplexed by the K UEs from the set of values of n, and select a to-be-selected encoding matrix corresponding to a value of N from the set of the to-be-selected encoding matrices as the encoding matrix used when the N transmission resources are multiplexed by the $2^N-1$ data layers, where n represents the number of the transmission resources corresponding to a to-be-selected encoding matrix, and the to-be-selected encoding matrix is an encoding matrix used when the N transmission resources are multiplexed by $2^n-1$ data layers.

In a possible embodiment of the present disclosure, in the case of selecting the number N of the transmission resources which are capable of being currently multiplexed by the K UEs from the set of values of n, and selecting the to-be-selected encoding matrix corresponding to the value of N from the set of the to-be-selected encoding matrices as the encoding matrix used when the N transmission resources are multiplexed by the $2^N-1$ data layers, the selection unit 70b is further configured to: select a random value from the set of values of n as the number N of the transmission resources which are capable of being currently multiplexed by the K UEs, the random value being not greater than the number of system-available frequency-domain resources and the corresponding $2^n-1$ predetermined data layers being capable of meeting a load requirement of the K UEs; and select a to-be-selected encoding matrix corresponding to the value of N from the set of the to-be-selected encoding matrices as the encoding matrix used when the N transmission resources are multiplexed by the $2^N-1$ data layers.

In a possible embodiment of the present disclosure, in the case that the processing unit 71b acquires the current data transmission rule, with respect to the mapping relationship between the K UEs and the data layers on the N transmission resources corresponding to the encoding matrix, each UE is mapped to at least one column of the encoding matrix that meets a corresponding transmission requirement parameter in accordance with the transmission requirement parameter of each UE, and each column of the encoding matrix corresponds to one data layer.

In a possible embodiment of the present disclosure, the transmission requirement parameter at least includes a load of each UE, and any one of the following parameters or any combination of the following combinations: signal-to-noise ratio (SNR), block error rate (BER) and power resource.

In a possible embodiment of the present disclosure, in the case that the processing unit acquires the current data transmission rule, each UE is mapped to one column of the encoding matrix that meets the transmission requirement parameter, or mapped to at least two columns of the encoding matrix that have an identical diversity order and meet the transmission requirement parameter, or mapped to at least two columns of the encoding matrix that have different diversity orders and meet the transmission requirement parameter. The diversity order is defined as the number of non-zero elements in each column of the encoding matrix and it is used to represent frequency-domain diversity acquired for data transmission.

In some embodiments of the present disclosure, the network side device may include the transmission unit 72a and the reception unit 72b simultaneously.

Figure 7C:
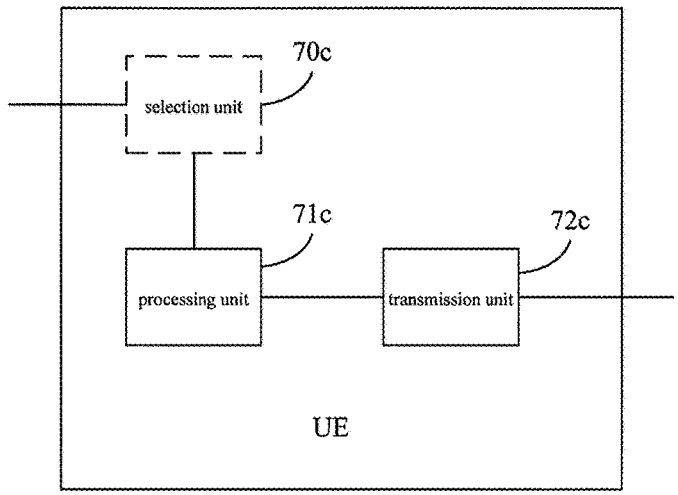
FIGS. 7c, 7d, 8c and 8d are schematic views showing a UE according to one embodiment of the present disclosure.

The present disclosure provides in some embodiments a UE which, as shown in FIG. 7c, includes: a processing unit 71c configured to acquire a current data transmission rule, the current data transmission rule including a mapping relationship between currently-scheduled K UEs and data layers on N transmission resources corresponding to a selected encoding matrix, one UE at least occupying one data layer, $K \le 2^N-1$; and a transmission unit 72c configured to transmit data to a network side in accordance with the current data transmission rule through the at least one data layer occupied by the UE in the encoding matrix.

According to the UE in the embodiments of the present disclosure, in the case of determining the number of the currently-scheduled UEs, various pattern-mapping encoding matrices may be selected flexibly. In addition, one UE is mapped to one or more data layers of the selected encoding matrix, so as to achieve the mapping relationship between multi-user data and the encoding matrix in a flexible manner. In the case that a frequency-domain resource block of a current system is multiplexed by a small amount of users, one UE may be mapped to a plurality of data layers, so it is able to increase a transmission load of the UE, thereby to increase a throughput of the entire system. Further, it is able to reduce a modulation encoding level while ensuring the spectral efficiency, thereby to further reduce algorithm complexity of a receiver.

In a possible embodiment of the present disclosure, the UE further includes a selection unit 70c configured to: prior to acquiring the current data transmission rule, determine the number K of the currently-scheduled UEs and the number N of the transmission resources multiplexed by the UEs indicated by the network side, $K \le 2^N-1$; and select an encoding matrix used when the N transmission resources are multiplexed by $2^N-1$ predetermined data layers.

In a possible embodiment of the present disclosure, in the case of determining the number K of the currently-scheduled UEs and the number N of the transmission resources multiplexed by the UEs, $K \le 2^N-1$, and selecting the encoding matrix used when the N transmission resources are multiplexed by the $2^N-1$ predetermined data layers, the selection unit 70c is further configured to: select, in accordance with a plurality of values of n corresponding to a plurality of predetermined to-be-selected encoding matrices, a set of values of n which each meets a condition $K \le 2^n-1$; select a set of the to-be-selected encoding matrices available for the K UEs from the plurality of to-be-selected encoding matrices in accordance with the set of values of n; and select the number N of the transmission resources which are capable of being currently multiplexed by the K UEs from the set of values of n, and select a to-be-selected encoding matrix corresponding to a value of N from the set of the to-be-selected encoding matrices as the encoding matrix used when the N transmission resources are multiplexed by the $2^N-1$ data layers, where n represents the number of the transmission resources corresponding to a to-be-selected encoding matrix, and the to-be-selected encoding matrix is an encoding matrix used when the N transmission resources are multiplexed by $2^n-1$ data layers.

In a possible embodiment of the present disclosure, in the case of selecting the number N of the transmission resources which are capable of being currently multiplexed by the K UEs from the set of values of n, and selecting the to-be-selected encoding matrix corresponding to the value of N from the set of the to-be-selected encoding matrices as the encoding matrix used when the N transmission resources are multiplexed by the $2^N-1$ data layers, the selection unit 70c is further configured to: select a random value from the set of values of n as the number N of the transmission resources which are capable of being currently multiplexed by the K UEs, the random value being not greater than the number of system-available frequency-domain resources and the corresponding $2^n-1$ predetermined data layers being capable of meeting a load requirement of the K UEs; and select a to-be-selected encoding matrix corresponding to the value of N from the set of the to-be-selected encoding matrices as the encoding matrix used when the N transmission resources are multiplexed by the $2^N-1$ data layers.

In a possible embodiment of the present disclosure, in the case that the processing unit 71c acquires the current data transmission rule, with respect to the mapping relationship between the K UEs and the data layers on the N transmission resources corresponding to the encoding matrix, each UE is mapped to at least one column of the encoding matrix that meets a corresponding transmission requirement parameter in accordance with the transmission requirement parameter of each UE, and each column of the encoding matrix corresponds to one data layer.

In a possible embodiment of the present disclosure, in the case that the processing unit 71c determines the mapping relationship between the K UEs and the data layers on the N transmission resources corresponding to the encoding matrix, the transmission requirement parameter at least includes a load of each UE, and any one of the following parameters or any combination of the following combinations: signal-to-noise ratio (SNR), block error rate (BER) and power resource.

In a possible embodiment of the present disclosure, in the case that the processing unit 71c acquires the current data transmission rule, each UE is mapped to one column of the encoding matrix that meets the transmission requirement parameter, or mapped to at least two columns of the encoding matrix that have an identical diversity order and meet the transmission requirement parameter, or mapped to at least two columns of the encoding matrix that have different diversity orders and meet the transmission requirement parameter. The diversity order is defined as the number of non-zero elements in each column of the encoding matrix and it is used to represent frequency-domain diversity acquired for data transmission.

Figure 7D:
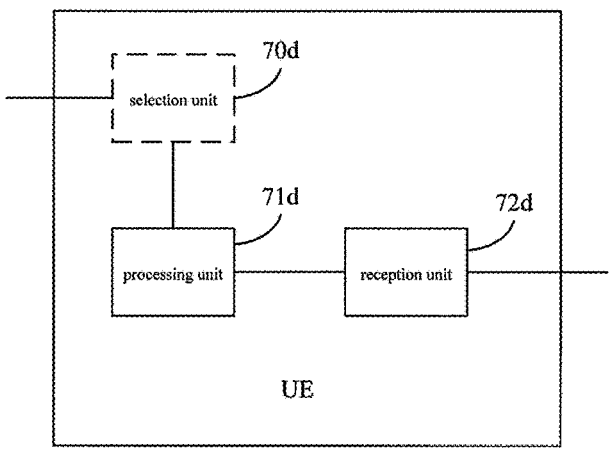

The present disclosure further provides in some embodiments another UE which, as shown in FIG. 7d, includes: a processing unit 71d configured to acquire a current data transmission rule, the current data transmission rule including a mapping relationship between currently-scheduled K UEs and data layers on N transmission resources corresponding to a selected encoding matrix, one UE at least occupying one data layer, $K \leq 2^N-1$; and a reception unit 72d configured to receive feedback data from a network side, the feedback data being fed back by the network side after receiving data transmitted from the UE in accordance with the current data transmission rule.

According to the UE in the embodiments of the present disclosure, in the case of determining the number of the currently-scheduled UEs, various pattern-mapping encoding matrices may be selected flexibly. In addition, one UE is mapped to one or more data layers of the selected encoding matrix, so as to achieve the mapping relationship between multi-user data and the encoding matrix in a flexible manner. In the case that a frequency-domain resource block of a current system is multiplexed by a small amount of users, one UE may be mapped to a plurality of data layers, so it is able to increase a transmission load of the UE, thereby to increase a throughput of the entire system. Further, it is able to reduce a modulation encoding level while ensuring the spectral efficiency, thereby to further reduce algorithm complexity of a receiver.

In a possible embodiment of the present disclosure, the UE further includes a selection unit 70d configured to: prior to acquiring the current data transmission rule, determine the number K of the currently-scheduled UEs and the number N of the transmission resources multiplexed by the UEs, $K \leq 2^N-1$; and select an encoding matrix used when the N transmission resources are multiplexed by $2^N-1$ predetermined data layers.

In a possible embodiment of the present disclosure, in the case of determining the number K of the currently-scheduled UEs and the number N of the transmission resources multiplexed by the UEs, $K \leq 2^N-1$, and selecting the encoding matrix used when the N transmission resources are multiplexed by the $2^N-1$ predetermined data layers, the selection unit 70d is further configured to: select, in accordance with a plurality of values of n corresponding to a plurality of predetermined to-be-selected encoding matrices, a set of values of n which each meets a condition $K \leq 2^n-1$; select a set of the to-be-selected encoding matrices available for the K UEs from the plurality of to-be-selected encoding matrices in accordance with the set of values of n; and select the number N of the transmission resources which are capable of being currently multiplexed by the K UEs from the set of values of n, and select a to-be-selected encoding matrix corresponding to a value of N from the set of the to-be-selected encoding matrices as the encoding matrix used when the N transmission resources are multiplexed by the $2^N-1$ data layers, where n represents the number of the transmission resources corresponding to a to-be-selected encoding matrix, and the to-be-selected encoding matrix is an encoding matrix used when the N transmission resources are multiplexed by $2^n-1$ data layers.

In a possible embodiment of the present disclosure, in the case of selecting the number N of the transmission resources which are capable of being currently multiplexed by the K UEs from the set of values of n, and selecting the to-be-selected encoding matrix corresponding to the value of N from the set of the to-be-selected encoding matrices as the encoding matrix used when the N transmission resources are multiplexed by the $2^N-1$ data layers, the selection unit 70d is further configured to: select a random value from the set of values of n as the number N of the transmission resources which are capable of being currently multiplexed by the K UEs, the random value being not greater than the number of system-available frequency-domain resources and the corresponding $2^n-1$ predetermined data layers being capable of meeting a load requirement of the K UEs; and select a to-be-selected encoding matrix corresponding to the value of N from the set of the to-be-selected encoding matrices as the encoding matrix used when the N transmission resources are multiplexed by the $2^N-1$ data layers.

In a possible embodiment of the present disclosure, in the case that the processing unit 71d acquires the current data transmission rule, with respect to the mapping relationship between the K UEs and the data layers on the N transmission resources corresponding to the encoding matrix, each UE is mapped to at least one column of the encoding matrix that meets a corresponding transmission requirement parameter in accordance with the transmission requirement parameter of each UE, and each column of the encoding matrix corresponds to one data layer.

In a possible embodiment of the present disclosure, in the case that the processing unit 71d determines the mapping relationship between the K UEs and the data layers on the N transmission resources corresponding to the encoding matrix, the transmission requirement parameter at least includes a load of each UE, and any one of the following parameters or any combination of the following combinations: signal-to-noise ratio (SNR), block error rate (BER) and power resource.

In a possible embodiment of the present disclosure, in the case that the processing unit 71d acquires the current data transmission rule, each UE is mapped to one column of the encoding matrix that meets the transmission requirement parameter, or mapped to at least two columns of the encoding matrix that have an identical diversity order and meet the transmission requirement parameter, or mapped to at least two columns of the encoding matrix that have different diversity orders and meet the transmission requirement parameter. The diversity order is defined as the number of non-zero elements in each column of the encoding matrix and it is used to represent frequency-domain diversity acquired for data transmission.

In some embodiments of the present disclosure, the UE may include both the transmission unit 72c and the reception unit 72d.

Figure 8A:
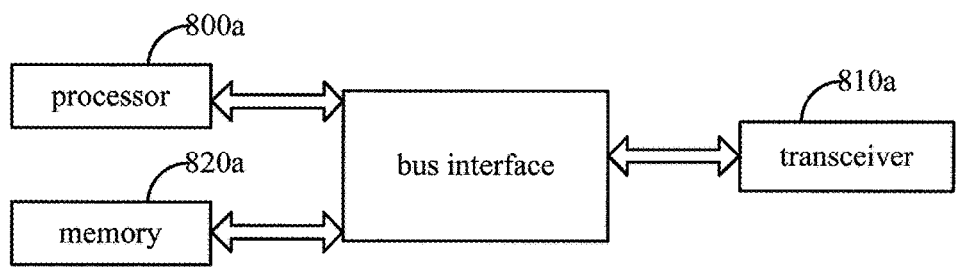

The present disclosure further provides in some embodiments a network side device which, as shown in FIG. 8a, includes a processor 800a, a transceiver 810a and a memory 820a. The processing unit 800a is configured to read a program stored in the memory 820a so as: acquire a current data transmission rule, the current data transmission rule including a mapping relationship between currently-scheduled K UEs and data layers on N transmission resources corresponding to a selected encoding matrix, one UE at least occupying one data layer, $K \leq 2^N - 1$; and transmit, through the transceiver 810a, data to the K UEs in accordance with the current data transmission rule.

According to the network side device in the embodiments of the present disclosure, in the case of determining the number of the currently-scheduled UEs, various pattern-mapping encoding matrices may be selected flexibly. In addition, one UE is mapped to one or more data layers of the selected encoding matrix, so as to achieve the mapping relationship between multi-user data and the encoding matrix in a flexible manner. In the case that a frequency-domain resource block of a current system is multiplexed by a small amount of users, one UE may be mapped to a plurality of data layers, so it is able to increase a transmission load of the UE, thereby to increase a throughput of the entire system. Further, it is able to reduce a modulation encoding level while ensuring the spectral efficiency, thereby to further reduce algorithm complexity of a receiver.

In a possible embodiment of the present disclosure, prior to acquiring the current data transmission rule, the processor 800a is further configured to determine the number K of the currently-scheduled UEs and the number N of the transmission resources multiplexed by the UEs, $K \leq 2^N - 1$; and select an encoding matrix used when the N transmission resources are multiplexed by $2^N - 1$ predetermined data layers.

In a possible embodiment of the present disclosure, in the case of determining the number K of the currently-scheduled UEs and the number N of the transmission resources multiplexed by the UEs, $K \leq 2^N - 1$, and selecting the encoding matrix used when the N transmission resources are multiplexed by the $2^N - 1$ predetermined data layers, the processor 800a is further configured to: select, in accordance with a plurality of values of n corresponding to a plurality of predetermined to-be-selected encoding matrices, a set of values of n which each meets a condition $K \leq 2^n - 1$; select a set of the to-be-selected encoding matrices available for the K UEs from the plurality of to-be-selected encoding matrices in accordance with the set of values of n; and select the number N of the transmission resources which are capable of being currently multiplexed by the K UEs from the set of values of n, and select a to-be-selected encoding matrix corresponding to a value of N from the set of the to-be-selected encoding matrices as the encoding matrix used when the N transmission resources are multiplexed by the $2^N - 1$ data layers, where n represents the number of the transmission resources corresponding to a to-be-selected encoding matrix, and the to-be-selected encoding matrix is an encoding matrix used when the N transmission resources are multiplexed by $2^n - 1$ data layers.

In a possible embodiment of the present disclosure, in the case of selecting the number N of the transmission resources which are capable of being currently multiplexed by the K UEs from the set of values of n, and selecting the to-be-selected encoding matrix corresponding to the value of N from the set of the to-be-selected encoding matrices as the encoding matrix used when the N transmission resources are multiplexed by the $2^N - 1$ data layers, the processor 800a is further configured to: select a random value from the set of values of n as the number N of the transmission resources which are capable of being currently multiplexed by the K UEs, the random value being not greater than the number of system-available frequency-domain resources and the corresponding $2^n - 1$ predetermined data layers being capable of meeting a load requirement of the K UEs; and select a to-be-selected encoding matrix corresponding to the value of N from the set of the to-be-selected encoding matrices as the encoding matrix used when the N transmission resources are multiplexed by the $2^N - 1$ data layers.

In a possible embodiment of the present disclosure, in the case that the processor 800a acquires the current data transmission rule, with respect to the mapping relationship between the K UEs and the data layers on the N transmission resources corresponding to the encoding matrix, each UE is mapped to at least one column of the encoding matrix that meets a corresponding transmission requirement parameter in accordance with the transmission requirement parameter of each UE, and each column of the encoding matrix corresponds to one data layer.

In a possible embodiment of the present disclosure, in the case that the processor 800a determines the mapping relationship between the K UEs and the data layers on the N transmission resources corresponding to the encoding matrix, the transmission requirement parameter at least includes a load of each UE, and any one of the following parameters or any combination of the following combinations: signal-to-noise ratio (SNR), block error rate (BER) and power resource.

In a possible embodiment of the present disclosure, in the case that the processor 800a acquires the current data transmission rule, each UE is mapped to one column of the encoding matrix that meets the transmission requirement parameter, or mapped to at least two columns of the encoding matrix that have an identical diversity order and meet the transmission requirement parameter, or mapped to at least two columns of the encoding matrix that have different diversity orders and meet the transmission requirement parameter. The diversity order is defined as the number of non-zero elements in each column of the encoding matrix and it is used to represent frequency-domain diversity acquired for data transmission.

In FIG. 8a, bus architecture may include a number of buses and bridges connected to each other, so as to connect various circuits for one or more processors 800a and one or more memories 820a. In addition, as is known in the art, the bus architecture may be used to connect any other circuits, such as a circuit for a peripheral device, a circuit for a voltage stabilizer and a power management circuit. Bus interfaces are provided, and the transceiver 810a may consist of a plurality of elements, i.e., a transmitter and a receiver for communication with any other devices over a transmission medium. The processor 800a may take charge of managing the bus architecture as well as general processing. The memory 820a may store data desired for the operation of the processor 800a.

Figure 8B:
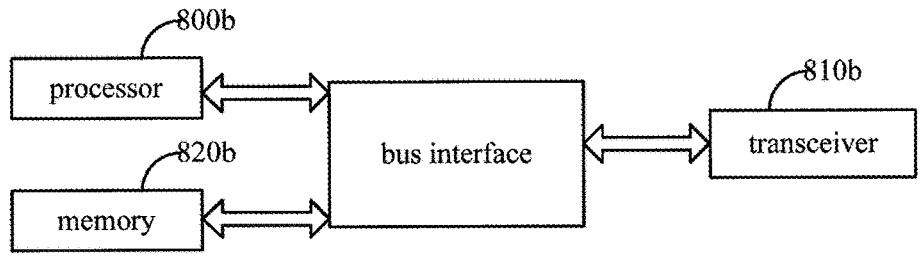

The present disclosure provides in some embodiments a network side device which, as shown in FIG. 8b, includes a processor 800b, a transceiver 810b and a memory 820b. The processor 800b is configured to read a program stored in the memory 820b, so as to: acquire a current data transmission rule, the current data transmission rule including a mapping relationship between currently-scheduled K UEs and data layers on N transmission resources corresponding to a selected encoding matrix, one UE at least occupying one data layer, $K \leq 2^N - 1$; and receive, through the transceiver 810b, data transmitted from the K UEs in accordance with the current data transmission rule.

According to the network side device in the embodiments of the present disclosure, in the case of determining the number of the currently-scheduled UEs, various pattern-mapping encoding matrices may be selected flexibly. In addition, one UE is mapped to one or more data layers of the selected encoding matrix, so as to achieve the mapping relationship between multi-user data and the encoding matrix in a flexible manner. In the case that a frequency-domain resource block of a current system is multiplexed by a small amount of users, one UE may be mapped to a plurality of data layers, so it is able to increase a transmission load of the UE, thereby to increase a throughput of the entire system. Further, it is able to reduce a modulation encoding level while ensuring the spectral efficiency, thereby to further reduce algorithm complexity of a receiver.

In a possible embodiment of the present disclosure, prior to acquiring the current data transmission rule, the processor 800b is further configured to: determine the number K of the currently-scheduled UEs and the number N of the transmission resources multiplexed by the UEs, $K \leq 2^N - 1$; and select an encoding matrix used when the N transmission resources are multiplexed by $2^N - 1$ predetermined data layers.

In a possible embodiment of the present disclosure, in the case of determining the number K of the currently-scheduled UEs and the number N of the transmission resources multiplexed by the UEs, $K \leq 2^N - 1$, and selecting the encoding matrix used when the N transmission resources are multiplexed by the $2^N - 1$ predetermined data layers, the processor 800b is further configured to: select, in accordance with a plurality of values of n corresponding to a plurality of predetermined to-be-selected encoding matrices, a set of values of n which each meets a condition $K \leq 2^n - 1$; select a set of the to-be-selected encoding matrices available for the K UEs from the plurality of to-be-selected encoding matrices in accordance with the set of values of n; and select the number N of the transmission resources which are capable of being currently multiplexed by the K UEs from the set of values of n, and select a to-be-selected encoding matrix corresponding to a value of N from the set of the to-be-selected encoding matrices as the encoding matrix used when the N transmission resources are multiplexed by the $2^N - 1$ data layers, where n represents the number of the transmission resources corresponding to a to-be-selected encoding matrix, and the to-be-selected encoding matrix is an encoding matrix used when the N transmission resources are multiplexed by $2^n - 1$ data layers.

In a possible embodiment of the present disclosure, in the case of selecting the number N of the transmission resources which are capable of being currently multiplexed by the K UEs from the set of values of n, and selecting the to-be-selected encoding matrix corresponding to the value of N from the set of the to-be-selected encoding matrices as the encoding matrix used when the N transmission resources are multiplexed by the $2^N - 1$ data layers, the processor 800b is further configured to: select a random value from the set of values of n as the number N of the transmission resources which are capable of being currently multiplexed by the K UEs, the random value being not greater than the number of system-available frequency-domain resources and the corresponding $2^n - 1$ predetermined data layers being capable of meeting a load requirement of the K UEs; and select a to-be-selected encoding matrix corresponding to the value of N from the set of the to-be-selected encoding matrices as the encoding matrix used when the N transmission resources are multiplexed by the $2^N - 1$ data layers.

In a possible embodiment of the present disclosure, in the case that the processor 800b acquires the current data transmission rule, with respect to the mapping relationship between the K UEs and the data layers on the N transmission resources corresponding to the encoding matrix, each UE is mapped to at least one column of the encoding matrix that meets a corresponding transmission requirement parameter in accordance with the transmission requirement parameter of each UE, and each column of the encoding matrix corresponds to one data layer.

In a possible embodiment of the present disclosure, the transmission requirement parameter at least includes a load of each UE, and any one of the following parameters or any combination of the following combinations: signal-to-noise ratio (SNR), block error rate (BER) and power resource.

In a possible embodiment of the present disclosure, in the case that the processor 800b acquires the current data transmission rule, each UE is mapped to one column of the encoding matrix that meets the transmission requirement parameter, or mapped to at least two columns of the encoding matrix that have an identical diversity order and meet the transmission requirement parameter, or mapped to at least two columns of the encoding matrix that have different diversity orders and meet the transmission requirement parameter. The diversity order is defined as the number of non-zero elements in each column of the encoding matrix and it is used to represent frequency-domain diversity acquired for data transmission.

In FIG. 8b, bus architecture may include a number of buses and bridges connected to each other, so as to connect various circuits for one or more processors 800b and one or more memories 820b. In addition, as is known in the art, the bus architecture may be used to connect any other circuits, such as a circuit for a peripheral device, a circuit for a voltage stabilizer and a power management circuit. Bus interfaces are provided, and the transceiver 810b may consist of a plurality of elements, i.e., a transmitter and a receiver for communication with any other devices over a transmission medium. The processor 800*b* may take charge of managing the bus architecture as well as general processing. The memory 820*b* may store data desired for the operation of the processor 800*b*.

Figure 8C:
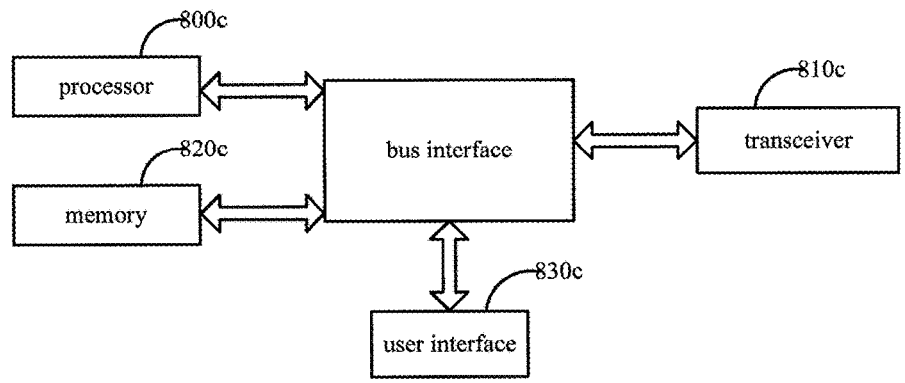

The present disclosure further provides in some embodiments a UE which, as shown in FIG. 8*c*, includes a processor 800*c*, a transceiver 810*c* and a memory 820*c*. The processor 800*c* is configured to read a program stored in the memory 820*c*, so as to: acquire a current data transmission rule, the current data transmission rule including a mapping relationship between currently-scheduled K UEs and data layers on N transmission resources corresponding to a selected encoding matrix, one UE at least occupying one data layer, $K \leq 2^N-1$; and transmit, through the transceiver 810*c*, data to a network side in accordance with the current data transmission rule through the at least one data layer occupied by the UE in the encoding matrix.

According to the UE in the embodiments of the present disclosure, in the case of determining the number of the currently-scheduled UEs, various pattern-mapping encoding matrices may be selected flexibly. In addition, one UE is mapped to one or more data layers of the selected encoding matrix, so as to achieve the mapping relationship between multi-user data and the encoding matrix in a flexible manner. In the case that a frequency-domain resource block of a current system is multiplexed by a small amount of users, one UE may be mapped to a plurality of data layers, so it is able to increase a transmission load of the UE, thereby to increase a throughput of the entire system. Further, it is able to reduce a modulation encoding level while ensuring the spectral efficiency, thereby to further reduce algorithm complexity of a receiver.

In a possible embodiment of the present disclosure, prior to acquiring the current data transmission rule, the processor 800*c* is further configured to: determine the number K of the currently-scheduled UEs and the number N of the transmission resources multiplexed by the UEs indicated by the network side, $K \leq 2^N-1$; and select an encoding matrix used when the N transmission resources are multiplexed by $2^N-1$ predetermined data layers.

In a possible embodiment of the present disclosure, in the case of determining the number K of the currently-scheduled UEs and the number N of the transmission resources multiplexed by the UEs, $K \leq 2^N-1$, and selecting the encoding matrix used when the N transmission resources are multiplexed by the $2^N-1$ predetermined data layers, the processor 800*c* is further configured to: select, in accordance with a plurality of values of n corresponding to a plurality of predetermined to-be-selected encoding matrices, a set of values of n which each meets a condition $K \leq 2^n-1$; select a set of the to-be-selected encoding matrices available for the K UEs from the plurality of to-be-selected encoding matrices in accordance with the set of values of n; and select the number N of the transmission resources which are capable of being currently multiplexed by the K UEs from the set of values of n, and select a to-be-selected encoding matrix corresponding to a value of N from the set of the to-be-selected encoding matrices as the encoding matrix used when the N transmission resources are multiplexed by the $2^N-1$ data layers, where n represents the number of the transmission resources corresponding to a to-be-selected encoding matrix, and the to-be-selected encoding matrix is an encoding matrix used when the N transmission resources are multiplexed by $2^n-1$ data layers.

In a possible embodiment of the present disclosure, in the case of selecting the number N of the transmission resources which are capable of being currently multiplexed by the K UEs from the set of values of n, and selecting the to-be-selected encoding matrix corresponding to the value of N from the set of the to-be-selected encoding matrices as the encoding matrix used when the N transmission resources are multiplexed by the $2^N-1$ data layers, the processor 800*c* is further configured to: select a random value from the set of values of n as the number N of the transmission resources which are capable of being currently multiplexed by the K UEs, the random value being not greater than the number of system-available frequency-domain resources and the corresponding $2^n-1$ predetermined data layers being capable of meeting a load requirement of the K UEs; and select a to-be-selected encoding matrix corresponding to the value of N from the set of the to-be-selected encoding matrices as the encoding matrix used when the N transmission resources are multiplexed by the $2^N-1$ data layers.

In a possible embodiment of the present disclosure, in the case that the processor 800*c* acquires the current data transmission rule, with respect to the mapping relationship between the K UEs and the data layers on the N transmission resources corresponding to the encoding matrix, each UE is mapped to at least one column of the encoding matrix that meets a corresponding transmission requirement parameter in accordance with the transmission requirement parameter of each UE, and each column of the encoding matrix corresponds to one data layer.

In a possible embodiment of the present disclosure, in the case that the processor 800*c* determines the mapping relationship between the K UEs and the data layers on the N transmission resources corresponding to the encoding matrix, the transmission requirement parameter at least includes a load of each UE, and any one of the following parameters or any combination of the following combinations: signal-to-noise ratio (SNR), block error rate (BER) and power resource.

In a possible embodiment of the present disclosure, in the case that the processor 800*c* acquires the current data transmission rule, each UE is mapped to one column of the encoding matrix that meets the transmission requirement parameter, or mapped to at least two columns of the encoding matrix that have an identical diversity order and meet the transmission requirement parameter, or mapped to at least two columns of the encoding matrix that have different diversity orders and meet the transmission requirement parameter. The diversity order is defined as the number of non-zero elements in each column of the encoding matrix and it is used to represent frequency-domain diversity acquired for data transmission.

In FIG. 8*c*, bus architecture may include a number of buses and bridges connected to each other, so as to connect various circuits for one or more processors 800*c* and one or more memories 820*c*. In addition, as is known in the art, the bus architecture may be used to connect any other circuits, such as a circuit for a peripheral device, a circuit for a voltage stabilizer and a power management circuit. Bus interfaces are provided, and the transceiver 810*c* may consist of a plurality of elements, i.e., a transmitter and a receiver for communication with any other devices over a transmission medium. With respect to different UEs, a user interface 830*c* may also be provided for devices which are to be arranged inside or outside the UE, and these devices may include but not limited to a keypad, a display, a speaker, a microphone and a joystick. The processor 800*c* may take charge of managing the bus architecture as well as general processing. The memory 820*c* may store therein data for the operation of the processor 800*c*.

Figure 8D:
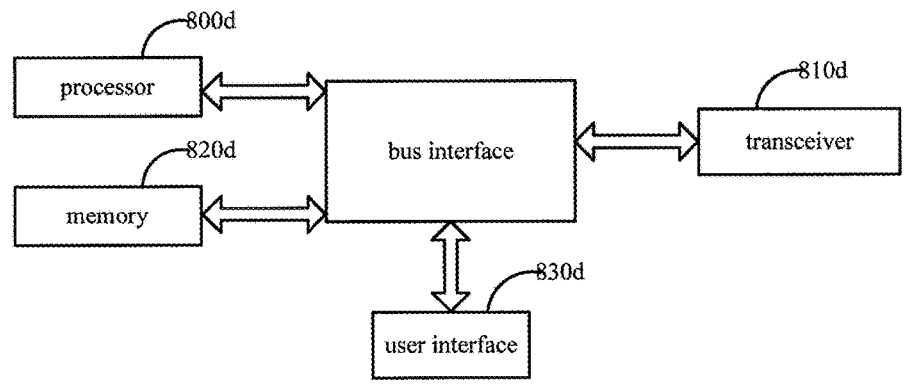

The present disclosure provides in some embodiments a UE which, as shown in FIG. 8*d*, includes a processor 800*d*, a transceiver 810*d* and a memory 820*d*. The processor 800*d* is configured to read a program stored in the memory 820*d*, so as to: acquire a current data transmission rule, the current data transmission rule including a mapping relationship between currently-scheduled K UEs and data layers on N transmission resources corresponding to a selected encoding matrix, one UE at least occupying one data layer, $K \leq 2^N - 1$; and receive, through the transceiver 810*d*, feedback data from a network side, the feedback data being fed back by the network side after receiving data transmitted from the UE in accordance with the current data transmission rule.

According to the UE in the embodiments of the present disclosure, in the case of determining the number of the currently-scheduled UEs, various pattern-mapping encoding matrices may be selected flexibly. In addition, one UE is mapped to one or more data layers of the selected encoding matrix, so as to achieve the mapping relationship between multi-user data and the encoding matrix in a flexible manner. In the case that a frequency-domain resource block of a current system is multiplexed by a small amount of users, one UE may be mapped to a plurality of data layers, so it is able to increase a transmission load of the UE, thereby to increase a throughput of the entire system. Further, it is able to reduce a modulation encoding level while ensuring the spectral efficiency, thereby to further reduce algorithm complexity of a receiver.

In a possible embodiment of the present disclosure, prior to acquiring the current data transmission rule, the processor 800*d* is further configured to: determine the number K of the currently-scheduled UEs and the number N of the transmission resources multiplexed by the UEs, $K \leq 2^N - 1$; and select an encoding matrix used when the N transmission resources are multiplexed by $2^N - 1$ predetermined data layers.

In a possible embodiment of the present disclosure, in the case of determining the number K of the currently-scheduled UEs and the number N of the transmission resources multiplexed by the UEs, $K \leq 2^N - 1$, and selecting the encoding matrix used when the N transmission resources are multiplexed by the $2^N - 1$ predetermined data layers, the processor 800*d* is further configured to: select, in accordance with a plurality of values of n corresponding to a plurality of predetermined to-be-selected encoding matrices, a set of values of n which each meets a condition $K \leq 2^n - 1$; select a set of the to-be-selected encoding matrices available for the K UEs from the plurality of to-be-selected encoding matrices in accordance with the set of values of n; and select the number N of the transmission resources which are capable of being currently multiplexed by the K UEs from the set of values of n, and select a to-be-selected encoding matrix corresponding to a value of N from the set of the to-be-selected encoding matrices as the encoding matrix used when the N transmission resources are multiplexed by the $2^N - 1$ data layers, where n represents the number of the transmission resources corresponding to a to-be-selected encoding matrix, and the to-be-selected encoding matrix is an encoding matrix used when the N transmission resources are multiplexed by $2^n - 1$ data layers.

In a possible embodiment of the present disclosure, in the case of selecting the number N of the transmission resources which are capable of being currently multiplexed by the K UEs from the set of values of n, and selecting the to-be-selected encoding matrix corresponding to the value of N from the set of the to-be-selected encoding matrices as the encoding matrix used when the N transmission resources are multiplexed by the $2^N - 1$ data layers, the processor 800*d* is further configured to: select a random value from the set of values of n as the number N of the transmission resources which are capable of being currently multiplexed by the K UEs, the random value being not greater than the number of system-available frequency-domain resources and the corresponding $2^n - 1$ predetermined data layers being capable of meeting a load requirement of the K UEs; and select a to-be-selected encoding matrix corresponding to the value of N from the set of the to-be-selected encoding matrices as the encoding matrix used when the N transmission resources are multiplexed by the $2^N - 1$ data layers.

In a possible embodiment of the present disclosure, in the case that the processor 800*d* acquires the current data transmission rule, with respect to the mapping relationship between the K UEs and the data layers on the N transmission resources corresponding to the encoding matrix, each UE is mapped to at least one column of the encoding matrix that meets a corresponding transmission requirement parameter in accordance with the transmission requirement parameter of each UE, and each column of the encoding matrix corresponds to one data layer.

In a possible embodiment of the present disclosure, in the case that the processor 800*d* determines the mapping relationship between the K UEs and the data layers on the N transmission resources corresponding to the encoding matrix, the transmission requirement parameter at least includes a load of each UE, and any one of the following parameters or any combination of the following combinations: signal-to-noise ratio (SNR), block error rate (BER) and power resource.

In a possible embodiment of the present disclosure, in the case that the processor 800*d* acquires the current data transmission rule, each UE is mapped to one column of the encoding matrix that meets the transmission requirement parameter, or mapped to at least two columns of the encoding matrix that have an identical diversity order and meet the transmission requirement parameter, or mapped to at least two columns of the encoding matrix that have different diversity orders and meet the transmission requirement parameter. The diversity order is defined as the number of non-zero elements in each column of the encoding matrix and it is used to represent frequency-domain diversity acquired for data transmission.

In FIG. 8*d*, bus architecture may include a number of buses and bridges connected to each other, so as to connect various circuits for one or more processors 800*d* and one or more memories 820*d*. In addition, as is known in the art, the bus architecture may be used to connect any other circuits, such as a circuit for a peripheral device, a circuit for a voltage stabilizer and a power management circuit. Bus interfaces are provided, and the transceiver 810*d* may consist of a plurality of elements, i.e., a transmitter and a receiver for communication with any other devices over a transmission medium. With respect to different UEs, a user interface 830*d* may also be provided for devices which are to be arranged inside or outside the UE, and these devices may include but not limited to a keypad, a display, a speaker, a microphone and a joystick. The processor 800*d* may take charge of managing the bus architecture as well as general processing. The memory 820*d* may store therein data for the operation of the processor 800*d*.

In a word, according to the embodiments of the present disclosure, the network side may determine the number K of the currently-scheduled UEs and the number N of the transmission resources multiplexed by the UEs (where N is greater than or equal to $\log_2(K+1)$, i.e., $K \leq 2^N - 1$), and determine the encoding matrix used when the N transmission resources are multiplexed by the $2^N-1$ predetermined data layers. The network side may then acquire the current data transmission rule. The current data transmission rule may include the mapping relationship between the currently-scheduled K UEs and data layers on N transmission resources, i.e., at least $\log_2$ (K+1) transmission resources, corresponding to a selected encoding matrix, and one UE may at least occupy one data layer. The network side may then transmit the data to the K UEs in accordance with the data transmission rule, and/or receive the data transmitted from the K UEs in accordance with the current data transmission rule. In this way, in the case of determining the number of the currently-scheduled UEs, various pattern-mapping encoding matrices may be selected flexibly. In addition, one UE is mapped to one or more data layers of the selected encoding matrix, so as to achieve the mapping relationship between multi-user data and the encoding matrix in a flexible manner. In the case that a frequency-domain resource block of a current system is multiplexed by a small amount of users, one UE may be mapped to a plurality of data layers, so it is able to increase a transmission load of the UE, thereby to increase a throughput of the entire system. Further, it is able to reduce a modulation encoding level while ensuring the spectral efficiency, thereby to further reduce algorithm complexity of a receiver.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A data transmission method, comprising steps of:
acquiring, by a network side, a mapping relationship between currently-scheduled K User Equipments (UEs) and data layers on at least $\log_2$ (K+1) transmission resources corresponding to a selected encoding matrix, where one UE at least occupying one data layer; and transmitting, by the network side, data to the K UEs in accordance with the mapping relationship between the currently-scheduled K UEs and the data layers on the at least $\log_2(K+1)$ transmission resources corresponding to the selected encoding matrix;

wherein, prior to the step of acquiring a mapping relationship between currently-scheduled K UEs and data layers on at least $\log_2(K+1)$ transmission resources corresponding to a selected encoding matrix, the method further comprises selecting, in accordance with a plurality of values of n corresponding to a plurality of predetermined to-be-selected encoding matrices, a set of values of n which each meets a condition $K \le 2^n-1$;

selecting a set of the to-be-selected encoding matrices available for the K UEs from the plurality of to-be-selected encoding matrices in accordance with the set of values of n;

selecting a random value from the set of values of n as the number N of the transmission resources which are capable of being currently multiplexed by the K UEs, the random value being not greater than the number of system-available frequency-domain resources and the corresponding $2^n-1$ predetermined data layers being capable of meeting a load requirement of the K UEs; and selecting a to-be-selected encoding matrix corresponding to a value of N from the set of the to-be-selected encoding matrices as the encoding matrix used when the N transmission resources are multiplexed by the $2^N-1$ data layers;

wherein n represents the number of the transmission resources corresponding to a to-be-selected encoding matrix that is the encoding matrix used when the N transmission resources are multiplexed by $2^n-1$ data layers, and wherein N being greater than or equal to $\log_2(K+1)$.

2. The data transmission method according to claim 1, wherein the mapping relationship between the K UEs and the data layers on the at least $\log_2$ (K+1) transmission resources corresponding to the encoding matrix comprises each UE being mapped to at least one column of the encoding matrix that meets a corresponding transmission requirement parameter in accordance with the transmission requirement parameter of each UE, where each column of the encoding matrix corresponding to one data layer.

3. The data transmission method according to claim 2, wherein each UE being mapped to at least one column of the encoding matrix that meets the corresponding transmission requirement parameter comprises:
- each UE being mapped to one column of the encoding matrix that meets the transmission requirement parameter, or
- each UE being mapped to at least two columns of the encoding matrix that have an identical diversity order and meet the transmission requirement parameter, or
- each UE being mapped to at least two columns of the encoding matrix that have different diversity orders and meet the transmission requirement parameter,
- wherein the diversity order is defined as the number of non-zero elements in one column of the encoding matrix and it is used to represent frequency-domain diversity acquired for data transmission.

4. The data transmission method according to claim 1, wherein the transmission requirement parameter at least comprises a load of each UE, and any one of the following parameters or any combination of the following combinations: signal-to-noise ratio (SNR), block error rate (BER) and power resource.

5. A data reception method, comprising steps of:
- acquiring, by a User Equipment (UE), a mapping relationship between currently-scheduled K UEs and data layers on at least $\log_2$ (K+1) transmission resources corresponding to a selected encoding matrix, where one UE at least occupying one data layer; and
- receiving, by the UE, feedback data from a network side, the feedback data being fed back by the network side after receiving data transmitted from the UE in accordance with the mapping relationship between the currently-scheduled K UEs and the data layers on the at least $\log_2$ (K+1) transmission resources corresponding to the selected encoding matrix;
- wherein, prior to the step of acquiring a mapping relationship between currently-scheduled K UEs and data layers on at least $\log_2$ (K+1) transmission resources corresponding to a selected encoding matrix, the method further comprises:
- selecting, in accordance with a plurality of values of n corresponding to a plurality of predetermined to-be-selected encoding matrices, a set of values of n which each meets a condition $K \leq 2^n - 1$;
- selecting a set of the to-be-selected encoding matrices available for the K UEs from the plurality of to-be-selected encoding matrices in accordance with the set of values of n;
- selecting a random value from the set of values of n as the number N of the transmission resources which are capable of being currently multiplexed by the K UEs, the random value being not greater than the number of system-available frequency-domain resources and the corresponding $2^n-1$ predetermined data layers being capable of meeting a load requirement of the K UEs; and
- selecting a to-be-selected encoding matrix corresponding to a value of N from the set of the to-be-selected encoding matrices as the encoding matrix used when the N transmission resources are multiplexed by the $2^N-1$ data layers;

wherein n represents the number of the transmission resources corresponding to a to-be-selected encoding matrix that is the encoding matrix used when the N transmission resources are multiplexed by $2^n-1$ data layers, and wherein N being greater than or equal to $\log_2(K+1)$.

6. The data reception method according to claim 5, wherein the mapping relationship between the K UEs and the data layers on the at least $\log_2$ (K+1) transmission resources corresponding to the encoding matrix comprises each UE being mapped to at least one column of the encoding matrix that meets a corresponding transmission requirement parameter in accordance with the transmission requirement parameter of each UE, where each column of the encoding matrix corresponding to one data layer.

7. The data reception method according to claim 6, wherein the transmission requirement parameter at least comprises a load of each UE, and any one of the following parameters or any combination of the following combinations: signal-to-noise ratio (SNR), block error rate (BER) and power resource.

8. The data reception method according to claim 6, wherein each UE being mapped to at least one column of the encoding matrix that meets the corresponding transmission requirement parameter comprises:
- each UE being mapped to one column of the encoding matrix that meets the transmission requirement parameter, or
- each UE being mapped to at least two columns of the encoding matrix that have an identical diversity order and meet the transmission requirement parameter, or
- each UE being mapped to at least two columns of the encoding matrix that have different diversity orders and meet the transmission requirement parameter,
- wherein the diversity order is defined as the number of non-zero elements in one column of the encoding matrix and it is used to represent frequency-domain diversity acquired for data transmission.

9. A network side device, comprising:
- a processing unit configured to acquire a mapping relationship between currently-scheduled K User Equipments (UEs) and data layers on at least $\log_2$ (K+1) transmission resources corresponding to a selected encoding matrix, where one UE at least occupying one data layer; and
- a transmission unit configured to transmit data to the K UEs in accordance with the mapping relationship between the currently-scheduled K UEs and the data layers on the at least $\log_2$ (K+1) transmission resources corresponding to the selected encoding matrix;
- wherein the network side device further comprises a selection unit configured to, prior to acquiring, by the processing unit, a mapping relationship between currently-scheduled K User Equipments (UEs) and data layers on at least $\log_2(K+1)$ transmission resources corresponding to a selected encoding matrix,
- select, in accordance with a plurality of values of n corresponding to a plurality of predetermined to-be-selected encoding matrices, a set of values of n which each meets a condition $K \leq 2^n-1$;
- select a set of the to-be-selected encoding matrices available for the K UEs from the plurality of to-be-selected encoding matrices in accordance with the set of values of n;
- select a random value from the set of values of n as the number N of the transmission resources which are capable of being currently multiplexed by the K UEs, the random value being not greater than the number of system-available frequency-domain resources and the corresponding $2^n-1$ predetermined data layers being capable of meeting a load requirement of the K UEs; and select a to-be-selected encoding matrix corresponding to a value of N from the set of the to-be-selected encoding matrices as the encoding matrix used when the N transmission resources are multiplexed by the $2^N-1$ data layers;

wherein n represents the number of the transmission resources corresponding to a to-be-selected encoding matrix that is the encoding matrix used when the N transmission resources are multiplexed by $2^n-1$ data layers, and wherein N being greater than or equal to $\log_2(K+1)$.

10. A User Equipment (UE), comprising:

a processing unit configured to acquire a mapping relationship between currently-scheduled K UEs and data layers on at least $\log_2$ (K+1) transmission resources corresponding to a selected encoding matrix, where one UE at least occupying one data layer; and a reception unit configured to receive feedback data from a network side, the feedback data being fed back by the network side after receiving data transmitted from the UE in accordance with the mapping relationship between the currently-scheduled K UEs and the data layers on the at least $\log_2$ (K+1) transmission resources corresponding to the selected encoding matrix;

wherein the UE further comprises a selection unit configured to, prior to acquiring a mapping relationship between currently-scheduled K UEs and data layers on at least $\log_2$ (K+1) transmission resources corresponding to a selected encoding matrix, by the processing unit, select, in accordance with a plurality of values of n corresponding to a plurality of predetermined to-be-selected encoding matrices, a set of values of n which each meets a condition $K \leq 2^n-1$;

select a set of the to-be-selected encoding matrices available for the K UEs from the plurality of to-be-selected encoding matrices in accordance with the set of values of n;

select a random value from the set of values of n as the number N of the transmission resources which are capable of being currently multiplexed by the K UEs, the random value being not greater than the number of system-available frequency-domain resources and the corresponding $2^n-1$ predetermined data layers being capable of meeting a load requirement of the K UEs; and select a to-be-selected encoding matrix corresponding to a value of N from the set of the to-be-selected encoding matrices as the encoding matrix used when the N transmission resources are multiplexed by the $2^N-1$ data layers;

wherein n represents the number of the transmission resources corresponding to a to-be-selected encoding matrix that is the encoding matrix used when the N transmission resources are multiplexed by $2^n-1$ data layers, and wherein N being greater than or equal to $\log_2(K+1)$.

11. The UE according to claim 10, wherein in the case that the processing unit acquires the mapping relationship between the currently-scheduled K UEs and the data layers on the at least $\log_2$ (K+1) transmission resources corresponding to the selected encoding matrix, the mapping relationship between the currently-scheduled K UEs and the data layers on the at least $\log_2$ (K+1) transmission resources corresponding to the selected encoding matrix comprises each UE being mapped to at least one column of the encoding matrix that meets a corresponding transmission requirement parameter in accordance with the transmission requirement parameter of each UE, where each column of the encoding matrix corresponding to one data layer.

12. The UE according to claim 11, wherein in the case that the processing unit determines the mapping relationship between the currently-scheduled K UEs and the data layers on the at least $\log_2$ (K+1) transmission resources corresponding to the selected encoding matrix, the transmission requirement parameter at least comprises a load of each UE, and any one of the following parameters or any combination of the following combinations: signal-to-noise ratio (SNR), block error rate (BER) and power resource.

13. The UE according to claim 11, wherein in the case that the processing unit acquires the mapping relationship between the currently-scheduled K UEs and the data layers on the at least $\log_2$ (K+1) transmission resources corresponding to the selected encoding matrix, each UE being mapped to at least one column of the encoding matrix that meets the corresponding transmission requirement parameter comprises:

each UE being mapped to one column of the encoding matrix that meets the transmission requirement parameter, or each UE being mapped to at least two columns of the encoding matrix that have an identical diversity order and meet the transmission requirement parameter, or each UE being mapped to at least two columns of the encoding matrix that have different diversity orders and meet the transmission requirement parameter, wherein the diversity order is defined as the number of non-zero elements in one column of the encoding matrix and it is used to represent frequency-domain diversity acquired for data transmission.

* * * * *